(12) United States Patent　　(10) Patent No.: US 10,992,999 B2
Redmond et al.　　(45) Date of Patent: Apr. 27, 2021

(54) TECHNIQUES FOR SEAMLESS MEDIA CONTENT SWITCHING DURING FIXED-DURATION BREAKS

(71) Applicant: Telefonaktiebolaget LM Ericsson (publ), Stockholm (SE)

(72) Inventors: Stefan Paul Redmond, Pointe-Claire (CA); Mario Colina, Saint Leonard (CA)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 16/432,154

(22) Filed: Jun. 5, 2019

(65) Prior Publication Data

US 2019/0289368 A1　Sep. 19, 2019

Related U.S. Application Data

(63) Continuation of application No. 15/578,060, filed as application No. PCT/IB2015/054106 on May 29, 2015, now Pat. No. 10,362,366.

(51) Int. Cl.
*H04N 21/81*　　(2011.01)
*G06Q 30/02*　　(2012.01)
*H04N 21/2343*　　(2011.01)
*H04N 21/462*　　(2011.01)
*H04N 21/4722*　　(2011.01)
(Continued)

(52) U.S. Cl.
CPC ....... *H04N 21/812* (2013.01); *G06Q 30/0251* (2013.01); *H04N 21/23424* (2013.01); *H04N 21/23439* (2013.01); *H04N 21/26258* (2013.01); *H04N 21/4622* (2013.01);
(Continued)

(58) Field of Classification Search
None
See application file for complete search history.

(56) References Cited

U.S. PATENT DOCUMENTS 6,802,077 B1 * 10/2004 Schlarb ................ H04N 7/165
　　　　　　　　　　　　　　　　　348/E5.006
8,966,520 B2　2/2015 Tom et al.
(Continued)

OTHER PUBLICATIONS

International Search Report and Written Opinion for Application No. PCT/IB2015/054106, dated Jul. 24, 2015, 10 pages.
(Continued)

*Primary Examiner* — Fernando Alcon
(74) *Attorney, Agent, or Firm* — NDWE LLP

(57) ABSTRACT

Techniques are disclosed for seamless media content switching during fixed-duration breaks. A user can request that a first media content item played by a client device during a fixed-length break be skipped. A server can determine an amount of time remaining in the break, determine an updated playlist of one or more media content items that together at least partially but not completely consume the entire amount of remaining time, and provide the updated playlist to the client device. The client device can determine a delay duration amount of time that it will continue playing the first media content item before skipping to a media content item from the updated playlist. This delay duration is determined such that the entire break can be filled with media content without any dead air or clipped media content.

16 Claims, 11 Drawing Sheets

(51) Int. Cl.
　　　*H04N 21/61*　　　(2011.01)
　　　*H04N 21/234*　　(2011.01)
　　　*H04N 21/262*　　(2011.01)

(52) U.S. Cl.
　　　CPC ..... *H04N 21/4722* (2013.01); *H04N 21/6125* (2013.01); *H04N 21/6175* (2013.01)

(56) References Cited

U.S. PATENT DOCUMENTS

| | | | |
|---|---|---|---|
| 9,301,020 B2* | 3/2016 | Sun | H04N 21/44016 |
| 9,743,124 B2 | 8/2017 | Green | |
| 9,872,048 B2 | 1/2018 | Zalewski | |
| 2003/0046689 A1* | 3/2003 | Gaos | H04N 21/454 |
| | | | 725/34 |
| 2003/0149621 A1 | 8/2003 | Shteyn | |
| 2004/0103429 A1* | 5/2004 | Carlucci | H04N 21/44016 |
| | | | 725/32 |
| 2008/0109840 A1 | 5/2008 | Walter et al. | |
| 2008/0235087 A1 | 9/2008 | Amento et al. | |
| 2010/0088714 A1* | 4/2010 | Hawkins | H04N 21/26603 |
| | | | 725/14 |
| 2010/0166389 A1 | 7/2010 | Knee et al. | |
| 2010/0199312 A1 | 8/2010 | Chang | |
| 2010/0205049 A1* | 8/2010 | Long | G06Q 30/0252 |
| | | | 705/14.5 |
| 2010/0280876 A1 | 11/2010 | Bowra | |
| 2011/0271299 A1 | 11/2011 | Kakani et al. | |
| 2012/0110618 A1 | 5/2012 | Kilar et al. | |
| 2012/0116883 A1 | 5/2012 | Asam et al. | |
| 2013/0080263 A1 | 3/2013 | Goldman | |
| 2013/0086607 A1 | 4/2013 | Tom et al. | |
| 2013/0152125 A1 | 6/2013 | Xiong | |
| 2013/0311908 A1* | 11/2013 | Ray | G06F 16/9577 |
| | | | 715/760 |
| 2017/0070789 A1* | 3/2017 | Liassides | H04N 21/44016 |

OTHER PUBLICATIONS

International Preliminary Report on Patentability for Application No. PCT/IB2015/054106, dated Dec. 14, 2017, 9 pages.
Non-Final Office Action for U.S. Appl. No. 15/578,060, dated Oct. 15, 2018, 23 pages.
Notice of Allowance for U.S. Appl. No. 15/578,060, dated Mar. 6, 2019, 7 pages.

* cited by examiner

TECHNIQUES FOR SEAMLESS MEDIA CONTENT SWITCHING DURING FIXED-DURATION BREAKS

CROSS-REFERENCE TO RELATED APPLICATIONS

This application is Continuation of U.S. patent application Ser. No. 15/578,060, filed Nov. 29, 2017, which is a National stage of International Application No. PCT/IB2015/054106, filed May 29, 2015, which is hereby incorporated by reference.

FIELD

Embodiments of the invention generally relate to the field of interactive media playback systems, and more specifically, to the field of advertising in interactive media playback systems.

BACKGROUND

Many forms of media content, including both audio-only and audiovisual, are available to consumers today. Several popular forms for delivering such media content include over-the-air (OTA) broadcast, satellite, cable, Internet-streaming and/or downloaded, etc. As one example, Internet Protocol television (IPTV) is a multimedia delivery platform that utilizes a packet-based network infrastructure (e.g., broadband Internet access networks) to deliver audiovisual content to customers, as an alternative or in addition to delivery by traditional over-the-air television, satellite television, and cable television.

Many forms of media content are provided to consumers (also referred to as users, end users, viewers, customers, subscribers, etc.) along with supplemental or promotional content. For example, many broadcast and cable content providers may provide a 30-minute block of programming including approximately 22 minutes of a program interleaved with several commercial breaks, totaling around 8 minutes. Similarly, for some content streamed over-the-top (OTT) of the Internet, such as streaming video providers or streaming audio providers, a media content item such as a video or song may be preceded by one or more advertisements, split into multiple segments with intermediary advertisements, and/or be followed by additional advertisements.

With the advent of modern two-way communications—as opposed to one-way OTA broadcast communications—content providers have become able to customize the content provided to their users, sometimes based upon real-time user input. Thus, in addition to media content providers being able to select and provide particular advertisements to particular users based upon their usage history, demographics, etc., content providers can even enable users to "skip" advertisements that are not relevant to the user. For example, before viewing a particular piece of video content, a user could choose to skip viewing a first provided advertisement and instead be presented with a different advertisement that may be more relevant to the user—upon the completion of that advertisement, then, the user can view the desired content. As another example, before listening to a desired song, a user may be allowed to skip a remainder of an advertisement and instead immediately be presented with the originally-desired content once a particular amount of the advertisement (e.g., half of the ad, 10 seconds of the ad) has been played.

However, these techniques for allowing user-directed customization of media content (e.g., advertisements) during programming having fixed-length breaks—such as "live" streams of substantially live content like sporting events or concerts—do not work. For example, allowing a user to completely skip an advertisement after 10 seconds of a 60-second break would result in the user waiting for 50 seconds for the programming to continue, resulting in "dead air" where the user is completely disengaged or wondering if the system is broken. As another example, allowing a user to skip a first advertisement after it has begun playing in favor of another advertisement suffers from a similar problem—either the advertisements will end well before the end of the break (again leaving dead air), or an advertisement will be "clipped" off such that only a part of its content is presented to the user before the programming continues. Clipped content can result in confused or upset users, as well as upset providers of the content, who did not get their entire content presented to the user.

Accordingly, systems avoiding these shortcomings while allowing for user-directed customized content during programming with fixed-duration breaks are desired.

SUMMARY

The present disclosure relates generally to interactive media playback systems; and more specifically, to techniques for seamless media content switching during fixed-duration breaks. Certain techniques are disclosed herein that enable users to "skip" the playing of certain media content during fixed-length breaks without resulting in "clipped" content or "dead air."

In some embodiments, a user can request that a first media content item played by a client device during a fixed-length break be skipped. A server can determine an amount of time remaining in the break, determine an updated playlist of one or more media content items that together at least partially but not completely consume the entire amount of remaining time, and provide the updated playlist to the client device. The client device can determine a delay duration that it will continue playing the first media content item before skipping to a media content item from the updated playlist. This delay duration is determined such that the entire break will be filled with media content without any "dead air" or "clipped" content (aside from the skipped media content item). Some embodiments can thus allow for seamless media content switching during fixed-duration breaks, such as those present in live IPTV streams, digital television, etc.

According to some embodiments, a method in a client device for seamless content switching during fixed-duration media breaks includes receiving, by the client device, a first media playlist identifying a first set of one or more media content items to be played during a break of a first fixed amount of time. The method also includes playing, by the client device, at least a portion of a first media content item from the first set of media content items of the first media playlist, and receiving, by the client device, a first user input indicating that the user desires to skip playing a remainder of the first media content item. The method further includes transmitting, to a server computing device, a skip request message indicating that the user desires to skip playing the remainder of the first media content item, and receiving, from the server computing device, a second media playlist identifying a second set of one or more media content items to be played during a remaining amount of time until the end of the break. The second set of media content items has a total time duration that is equal to or less than the remaining amount of time until the end of the break. The method further includes determining, by the client device, a delay duration amount of time comprising a difference between the total time duration of the second set of media content items and the remaining amount of time until the end of the break, and continuing, by the client device, to play the first media content item for up to the delay duration amount of time.

In some embodiments, the method includes, after the continuing to play the first media content item for the delay duration, switching to play at least one media content item of the second set of media content items.

According to some embodiments, the method includes, before the end of the delay duration amount of time, receiving a user input indicating that the user no longer desires to skip playing the remainder of the first media content item, and completing the playing of the entire first media content item. In some embodiments, the method further includes, after the completing of the playing of the entire first media content item, playing another media content item from the first set of media content items identified by the first media playlist.

In some embodiments, the method includes transmitting, to the server computing device, a cancel skip message indicating that the user desires to continue the playing of the first media content item that previously had been requested to be skipped.

According to some embodiments, the method includes presenting, to the user, an indication that the first media content item will be skipped after the delay duration amount of time has elapsed.

According to some embodiments, the method includes receiving, by the client device, a break duration value indicating the first fixed amount of time of the break.

Additionally, according to some embodiments, a method in a server computing device for coordinating seamless content switching during fixed-duration media breaks includes transmitting, to a client device of a user, a first media playlist identifying a first set of one or more media content items to be played by the client device during a break of a first fixed amount of time, and receiving, from the client device, a skip request message indicating that the user desires the client device to skip playing a remainder of a first media content item of the set of media content items. The method also includes determining, by the server computing device, a remaining amount of time until the end of the break, and determining, based upon the remaining amount of time, a second media playlist identifying a second set of one or more media content items to be played by the client device during the remaining amount of time of the break that collectively have a total time duration that is less than the remaining amount of time. The method also includes transmitting, to the client device, the second media playlist.

In some embodiments, the transmitting of the second media playlist causes the client device to continue playing the first media content item for a delay duration amount of time, which is equal to a difference between the total time duration and the remaining amount of time, and then switching to begin playing at least one content item of the second set of media content items of the second media playlist.

In some embodiments, the determining of the remaining amount of time until the end of the break comprises determining, by the server computing device, an estimated network latency between the server computing device and the client device, and the remaining amount of time until the end of the break is determined based in part upon the estimated network latency.

In some embodiments, the determining of the second media playlist comprises selecting the second set of media content items from a plurality of candidate media content items based at least in part upon durations of the plurality of candidate media content items.

According to some embodiments, a non-transitory computer-readable storage medium can store instructions which, when executed by a processor of a computing device such as a client device or server computing device, cause the computing device to perform any of the above methods. According to some embodiments, an apparatus is described that comprises a processor and this non-transitory computer-readable storage medium.

Accordingly, some embodiments can enable users to skip playing media content items that do not interest the user during a fixed-duration break without resulting in dead air or clipped media content. Thus, network bandwidth in such systems can be used more effectively for content that is more of interest to users, instead of "wasting" this bandwidth with transmitted content that may be completely ignored or disregarded.

Moreover, some embodiments can avoid repeating presenting skipped, unwanted media content items to the user again during programming with fixed-duration breaks. Additionally, in some embodiments, media content providers can gain insight into analytics of user-requested skip behavior (e.g., skip requests, skip cancellation requests) for particular media content items presented during programming having fixed-duration breaks.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
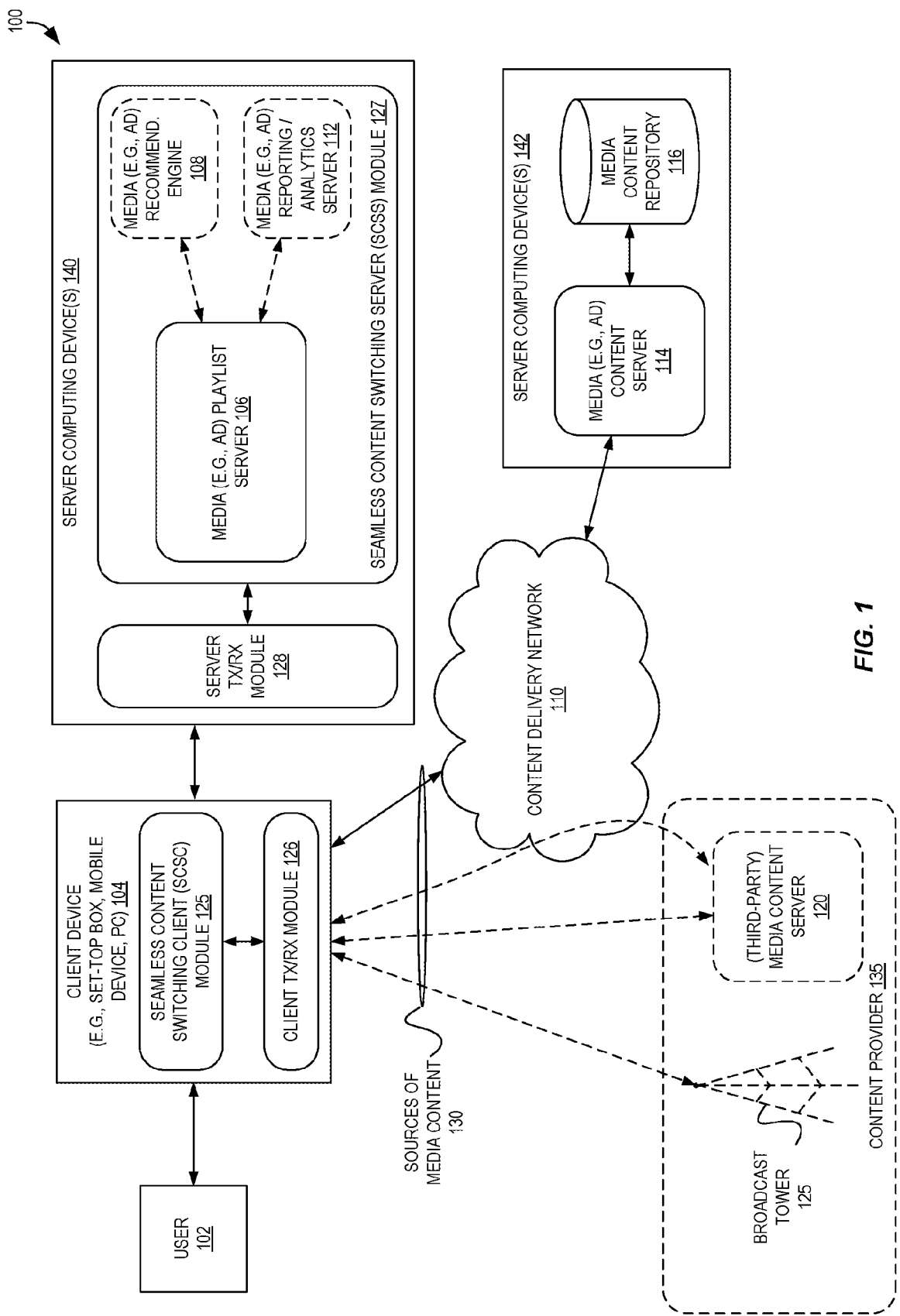
FIG. 1 is a block diagram illustrating an exemplary media system providing seamless media content switching during fixed-duration breaks according to some embodiments.

The following description describes methods, apparatuses, systems, and user interfaces for seamless media content switching during fixed-duration breaks. In the following description, numerous specific details such as logic implementations, resource partitioning/sharing/duplication implementations, types and interrelationships of system components, and logic partitioning/integration choices are set forth in order to provide a more thorough understanding of embodiments of the present invention. It will be appreciated, however, by one skilled in the art that the invention may be practiced without such specific details. In other instances, control structures, gate level circuits, and full software instruction sequences have not been shown in detail in order not to obscure aspects of the invention. Those of ordinary skill in the art, with the included descriptions, will be able to implement appropriate functionality without undue experimentation. Accordingly, the figures and description provided herein are not intended to be restrictive.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The present disclosure relates generally to interactive media playback systems, and more specifically, to techniques for seamless media content switching during fixed-duration breaks. Certain techniques are disclosed herein that enable users to "skip" the playing of certain media content items during fixed-length breaks without resulting in "clipped" content or "dead air." Thus, according to some embodiments, when a user presses a "skip button" during a live advertising break of fixed-duration, the actual skip will only take place after a time determined such that the new playlist of substitute media content item (e.g., advertisement) will completely fill the remaining advertising break time.

In some embodiments, a user can request that a media content item played by a client device during a fixed-length break be skipped. This media content item can be, in some embodiments, any of the media content items played during the break, such as the first media content item, second media content item, etc. When the skip request occurs, a server can determine an amount of time remaining in the break, determine an updated playlist of one or more media content items that together at least partially but not completely consume the entire amount of remaining time, and provide the updated playlist to the client device. The client device can determine a delay duration that it will continue playing the first media content item before skipping to a media content item from the updated playlist. This delay duration is determined such that the entire break will be filled with media content without any "dead air" or "clipped" content (aside from the skipped media content item). Some embodiments can thus allow for seamless media content switching during fixed-duration breaks, such as those present in live IPTV streams, digital television, time-shifted live streams, etc., and thus can allow media content (e.g., advertisements) to be skipped during a live stream's advertisement break and/or in time-shifted advertisement breaks, while maintaining allocated commercial break timeslots.

Accordingly, in some embodiments a user can be allowed to skip the playing of a media content item during a break at any time (although, perhaps subject to any applicable non-"skip-able" lead-in time for the media content item, etc.), and the system can compute a new playlist of media content items 'on the fly' to substitute in for the skipped media content item that will fill as closely as possible the remaining time for the fixed-duration break. As the substituted playlist of media content items may be unlikely to exactly fill the remaining time for the fixed-duration break, when the user presses the skip button, the actual skip may take place after a calculated time (e.g., a "delay duration") so that the new playlist of substitute media content items exactly fills the remaining fixed-duration break time.

In some embodiments, after a user presses a "skip" button (e.g., presented via a user interface display as a virtual button, using a physical button on a remote control device, etc.), the user can be presented a delayed skip notification indicating how long the to-be-skipped media content item will continue being played until the skip occurs. For example, the delayed skip notification may indicate that the ad will skip "in X seconds", where "X" can be the number of seconds which, together with the duration of the substituted playlist of media content items, is determined to exactly fill the remaining time of the fixed-duration break. In some embodiments, the delayed skip notification can update itself as time elapses—e.g., the number of seconds can count down—until the actual, calculated skip to the substituted media content item occurs.

Accordingly, in some embodiments, the timing of the media content items played during the fixed-duration break can therefore be determined to always fit in with live programming schedules.

In some embodiments, the user can be allowed to skip up to only a pre-determined number of media content items during a particular break (e.g., 2), program (i.e., across a number of breaks for a same program), or unit of time (e.g., within a day, within an hour, etc.). In various embodiments, the ability to skip media content items can either be predetermined for a particular media content item or calculated when a media content item substitution takes place, depending on the fixed-duration break time remaining.

As used herein, the term "media content" item may be used to refer to a particular unit of audio and/or visual content such as a video having both audio and visual aspects; visual-only content such as a still image, animated image, silent video; and audio-only content such as a voice recording or song, etc. Accordingly, various embodiments can be used to "play" different media content items by visually displaying them (e.g., transmitting/sending video signals causing a display device such as a television, screen, projector, etc., to display visual content) and/or outputting sound for them (e.g., transmitting/sending audio signals to cause speakers or other sound-producing components to create sounds).

FIG. 1 is a block diagram illustrating an exemplary media system providing seamless media content switching during fixed-duration breaks according to some embodiments. FIG. 1 illustrates a user 102 utilizing and/or interacting with a client device 104 having a seamless content switching client (SCSC) module 125 and a client transmit/receive (TX/RX) module 126. Client device 104 can be a computing device capable of playing media content from a variety of sources, such as media content provided through a media program service. For example, a client device 104 can be a Set Top Box (STB) that can be connected to a display (commonly a television set but can be another type of display such as a computer monitor, projector, etc.), a smart television, a Blu-Ray or DVD player or the like, a smart phone, a tablet, a laptop, a desktop, a portable media player, a gaming system, a wearable computing device (e.g., a smartwatch, digital eyewear), etc., each of which can include circuitry (e.g., one or more processors, a memory, etc.), a display and/or interfaces to a display, and/or software to allow connectivity/interaction with other entities, such as the depicted media playlist server 106, media content server 114, etc.

Client device 104 can be configured to play media content items from a variety of sources of media content 130, including over-the-air broadcasts from a broadcast antenna 125 or satellite, and content transmitted across public or private communication networks (or a combination of both) by media content server 120 (or media content server 114), which could be an audio or video streaming service providing media content via the Internet or via a content delivery network (CDN) 110, for example. These content sources are depicted as being from a content provider 135, which may or may not be a different entity than the entity providing the media content items as part of fixed-duration breaks as discussed herein.

Accordingly, user 102 can utilize client device 104 to play media content items having fixed-duration breaks, such as "live" streams/broadcasts, from any of a variety of sources. In playing such a media content item, the SCSC module 125 can be configured to detect an upcoming fixed-duration break, and request a playlist identifying one or more media content items to be played during the fixed-duration break from a media playlist server 106 of a seamless content switching server (SCSS) module 127. For example, the SCSC module 125 can transmit an "ad playlist request" message to the SCSS module 127 by way of server transmit/receive (TX/RX) module 128 (e.g., by using client TX/RX module 126). The ad playlist request message can include any of an identifier of the user 102, an identifier of the client device 104, a requested playlist duration (e.g., a length of the fixed-duration break), etc.

Throughout this description, reference may be made to the SCSC module (125) transmitting or receiving certain data. In these instances, it may be implied that the SCSC module (125) performs these operations via the client TX/RX module 126, and thus the client TX/RX module 126 may not be explicitly called out in all instances as being involved. Additionally, reference may also be made to the SCSS module 127 transmitting or receiving certain data. Similarly, in these instances it may be implied that the SCSS module 127 performs these operations via the server TX/RX module 128, and thus the server TX/RX module 128 may not be explicitly called out in all instances as being involved. The client TX/RX module 126 and/or server TX/RX module 128 can comprise, depending upon the embodiment, a physical network interface card having one or more physical network interfaces/ports or just a single physical network interface/port (see 1015 of FIG. 10), an input/output device or interface (see 1025 of FIG. 10), a software library or set of routines for sending or receiving messages (e.g., a kernel library) using hardware units, a communications bus, etc.

In response, the SCSS module 127 can determine a particular set of media content items for such a playlist, and transmit (e.g., using server TX/RX module 128) the playlist back to the SCSC module 125 of the client device 104. The SCSS module 127 can, for example, determine the set of media content items for the client device 104 to play using a media recommendation engine 108. For example, the media playlist server 106 can send a message to (or otherwise invoke) the media recommendation engine 108 requesting such a playlist be generated. The message can include any of an identifier of the user 102, an identifier of the client device 104, a requested playlist duration (e.g., a length of the fixed-duration break), etc. The media recommendation engine 108 can select one or more media content items for the playlist based upon many different factors known to those of skill in the art, including but not limited to a time of day, demographic information of the user 102, prior history of the user 102 (e.g., program viewing, advertisement viewing, visited websites, etc.), a type or other descriptive information of the particular program currently being watched by the user 102, a requested length of the requested playlist, etc.

Each selected media content item may be represented in the playlist by one or more of a location identifier of the content (e.g., a URI, URL, file system path, etc.), a duration value indicating a length of the content, a name of the content, a name of an originator of the content (e.g., a company creating a particular advertisement), a short description of the content, etc.

After transmitting the playlist back to the SCSC module 125, when the break occurs (or in advance of the break occurring), the SCSC module 125 can identify and begin acquiring a media content item from the set of media content items identified by the playlist to be played. In some embodiments, this identification/acquisition can include using a location identifier of a media content item to issue a request for the content. For example, the location identifier may identify a media content server 114 that can access the media content that is stored in a media content repository 116. Alternatively, the location identifier may identify one or more servers within a content delivery network 110 that can access the media content item (e.g., have a cached copy of the media content item, can access the media content item from the media content server 114, etc.) The SCSC module 125 can then, for example, begin streaming or downloading the particular media content item using the location identifier.

In some embodiments, the SCSC module 125 is adapted to allow users to request a "skip" of a particular media content item being played during a fixed-duration break. For example, the user 102 can use a physical or virtual remote control, and/or directly interact with the client device 104, etc., to provide a user input indicating that the user 102 desires to skip playing a remainder of the currently-playing media content item. In response, the SCSC module 125 can transmit a skip request message to the SCSS module 127 indicating the same, which can include any of an identifier of the user 102, an identifier of the client device 104, a remaining duration of the fixed-duration break, etc.

The media playlist server 106 can be configured to, upon receiving the skip request message, determine an updated set of media content items for the client device 104 to play using media recommendation engine 108. As described above, the media playlist server 106 can send a message to (or otherwise invoke) the media recommendation engine 108 requesting that such an "updated" playlist be generated. The message can include any of an identifier of the user 102, an identifier of the client device 104, a requested playlist duration (e.g., the remaining duration of the fixed-duration break), etc.

At this point, the media recommendation engine 108 can determine the set of media content items for the requested playlist as described above. However, the media recommendation engine 108 may be configured to only generate playlists having a same duration or a lesser duration than the requested playlist duration. Thus, in such embodiments the media recommendation engine 108 will not generate playlists having longer playing durations than the requested playlist durations, but may generate playlists having durations of lesser time than the corresponding requested durations.

When the updated playlist (generated as a result of the skip request message) is returned to the SCSC module 125, the SCSC module 125 can be configured to detect a delay duration of time equal to a difference between the remaining amount of time until the end of the fixed-duration break and the received playlist duration. For example, if there are twenty-seven seconds remaining in the fixed-duration break while the updated playlist total duration is only twenty seconds, the SCSC module 125 can determine a delay duration of (27−20)=7 seconds.

With this determined delay duration, the SCSC module 125 can be configured to continue to play the current media content item—i.e., the one for which the user 102 requested to be skipped—for up to the delay duration amount of time. Continuing the above example, the SCSC module 125 can continue playing the media content item for up to 7 seconds.

In some embodiments, the SCSC module 125 can be configured to, upon continuing to play the current media content for the delay duration, begin playing a media content item from the updated playlist. Accordingly, there will be no "dead air" or "clipped content" while the entire fixed-duration break will be beneficially filled with media content.

In some embodiments, the SCSC module 125 can be configured to allow users to, during the delay duration in which the requested-to-be-skipped media content item is continued to be played, indicate a desire to cancel the skip of the media content item. For example, as described above, the user 102 can use a physical or virtual remote control, and/or directly interact with the client device 104, etc., to provide a user input to the SCSC module 125. However, this user input indicates that the user 102 desires to halt the previously-requested skip of the media content item and thus to play a remainder of the currently-playing media content item.

In response, the SCSC module 125 can continue playing the currently-playing media content item and, instead of switching to play media content from the updated playlist (returned responsive to the original skip request message), continue playing media content from the original playlist. Thus, the updated playlist is effectively ignored, and the SCSC module 125 can be configured to delete this playlist.

Additionally, in some embodiments the SCSC module 125 can be configured to transmit a cancel skip message to the SCSS module 127 indicating that the user 102 has, in fact, decided to cancel the skip and instead continue playing the media content item.

In some embodiments, the media playlist server 106 can be configured to report various activities/occurrences to the media reporting and analytics server 112 component of the SCSS module 127 to be recorded. For example, media playlist server 106 can be configured to report receipt of the various ad playlist request messages from the SCSC module 125, report the particular playlists generated in response, and/or report receipt of the cancel skip request messages. By tracking this data, the media reporting and analytics server 112 can thus allow for data analysis and/or querying of this data to determine media content viewing metrics, determine particularly "interesting" or "non-interesting" media content items (e.g., as determined by a low or high frequency of a media content item being "skipped"), etc. This analysis can occur dynamically (e.g., in response to a request/query, in response to a particular pattern being detected by a new "event") or periodically (e.g., as part of a periodic execution of a report/analysis).

Figure 2:
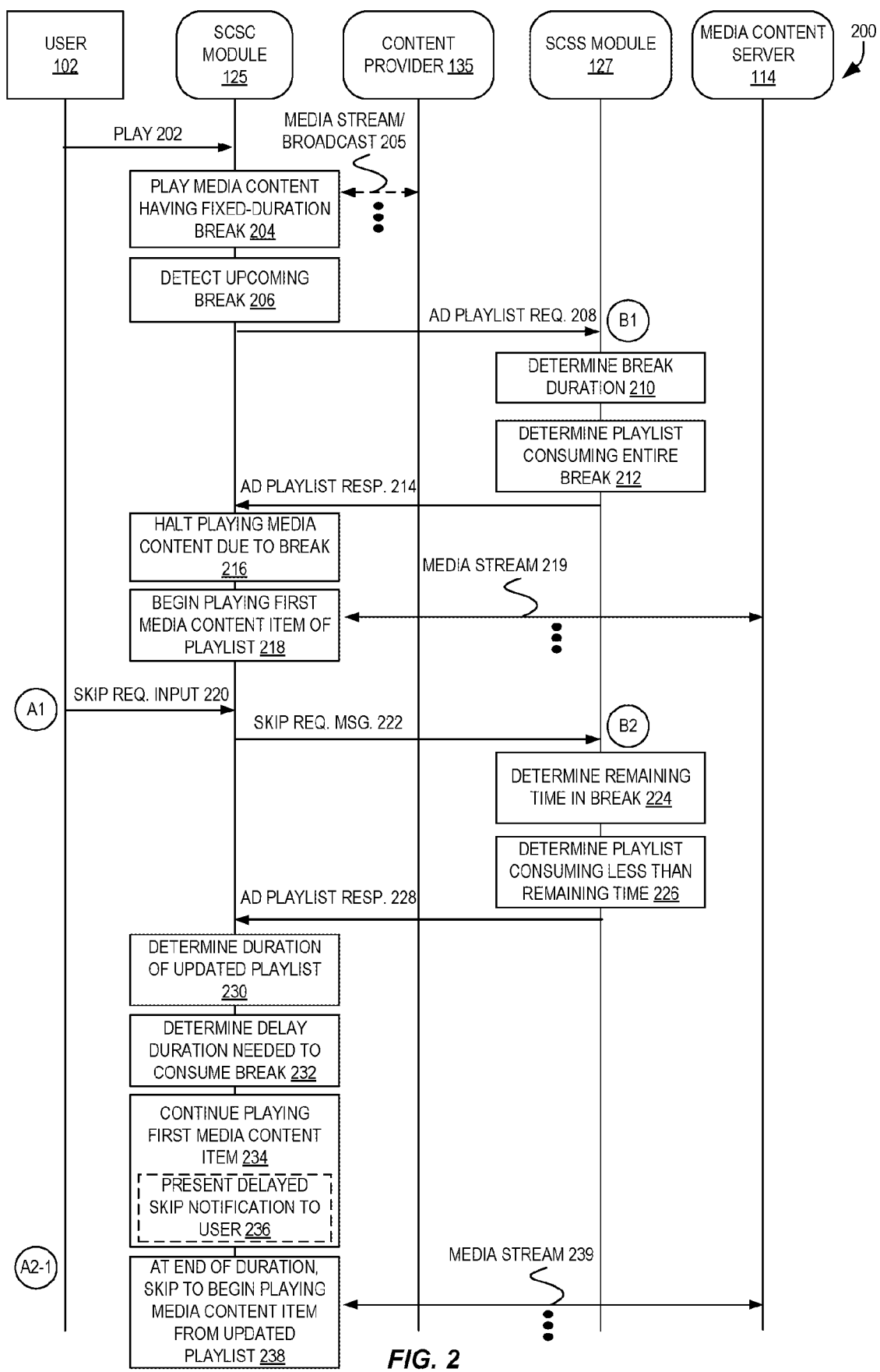
FIG. 2 is a combined sequence and flow diagram illustrating exemplary operations for playing media content and performing seamless media content switching according to some embodiments.

For further explanation, we turn to FIG. 2, which presents a combined sequence and flow diagram 200 illustrating exemplary operations for playing media content and performing seamless media content switching according to some embodiments. FIG. 2 includes exemplary operations performed by and the messaging between various entities from FIG. 1 including the user 102, SCSC module 125, content provider 135, SCSS module 127, and media content server 114.

The combined sequence and flow diagram 200 begins with the user 102 instructing the SCSC module 125 to play 202 a particular media content item. This instruction comprises a user input which can include the user 102 powering on the client device 104, using a physical (e.g., a remote control device) or virtual (e.g., software application) control to select a program/channel/etc., etc.

In response, at block 204 the SCSC module 125 plays the media content, which has a fixed-duration break. Playing the media content can include, as illustrated by arrow 205, receiving a broadcast-type signal (e.g., digital television) from a content provider 135, receiving data over one or more wired or wireless communication networks (e.g., IPTV), receiving data from a CDN 110 or media content server 114, etc. However, in some embodiments block 204 can include accessing and playing media content (e.g., a previously recorded program) from a storage medium such as a disk drive or storage array. Thus, as an example, embodiments can provide seamless media content switching during fixed-duration breaks for recorded programming, and can function for certain client devices 104 (e.g., DVRs) that prevent "trick modes" (such as fast-forward functionality) during playback of certain breaks. In some embodiments, as part of the media stream/broadcast 205, media content metadata is also sent, which can include a data value indicating a total duration of the media content is sent, indications of when the breaks occur, the lengths of these breaks, etc. However, in some embodiments these metadata values may be separately provided by the content provider 135 or even another entity, such as an entity operating the SCSS module 127 or another directory service entity, and yet in other embodiments this metadata is not provided.

At some point, while the media content item is being played, a fixed-duration break approaches, and the SCSC module 125 can detect the upcoming break at block 206. In some embodiments, the SCSC module 125 detects the upcoming fixed-duration break based upon received media content metadata, which can explicitly indicate the timing of such breaks. In some embodiments, the SCSC module 125 detects the upcoming fixed-duration break based upon break-detection mechanisms known to those of skill in the art, which can include the use of "markers" within the media content item itself, such as the use of "blank" audio and/or visual frames within the played media content item.

In response, the SCSC module 125 can transmit an ad playlist request message 208 to the SCSS module 127. This transmission can occur a configured amount of time before the break is to occur. For example, the SCSC module 125 can be configured to transmit the ad playlist request message 208 five seconds before the break is to occur. In other embodiments, the SCSC module 125 can instead send the ad playlist request message 208 earlier, such as when the media content item is first played (e.g., at block 204), or immediately upon detection of a break (e.g., when image recognition processes are utilized for break-detection, for example).

The ad playlist request message 208 can indicate a request for the SCSS module 127 to return, to the requesting SCSC module 125, a playlist identifying one or more media content items to be played during the fixed-duration break. In some embodiments, the ad playlist request message 208 includes an identifier of the user 102 and/or client device 104, and in some embodiments the ad playlist request message 208 includes a duration value indicating the duration of the fixed-break. In some embodiments, the ad playlist request message 208 includes an identifier of the media content being played that has the fixed-duration breaks, which can allow for customized fixed-break media content to be selected (e.g., specialized ads can be selected based upon a particular program being played, specialized musical content items can be selected based upon the particular program being played, etc.).

In the depicted example of FIG. 2, in response, at block 210 the SCSS module 127 determines the break duration, which can be based upon the ad playlist request message 208 (e.g., identifying a provided duration value from the message) or based upon stored data structures representing a schedule of programming.

At block 212, the SCSS module 127 determines a playlist of one or more media content items having a total duration that is the same as, or approximately the same as (e.g., within a half-second, within a second, within two seconds, etc.), the duration of the break. The playlist can comprise one or more media content item entries, each of which is associated with a media content item in the playlist. Each media content item entry can include a location identifier that identifies a location of the media content item, and/or an identifier that uniquely identifies a particular media content item within a particular context (e.g., an identifier value that, from the perspective of the media content server 114, can be used to uniquely identify a particular media content item from media content repository 116).

In some embodiments, each media content item entry in the playlist can include a duration value indicating a playing time of the associated media content item for that entry. For example, a first entry for a first media content item can include a duration value of "20", "00:00:20.00", or the like, indicating that the first media content item has a duration of twenty seconds. In some embodiments, though, the playlist includes a playlist duration value indicating a total duration of all media content items within the playlist. For example, the playlist can include a duration value of "120" (i.e., 120 seconds), "00:02:00.00", or the like, indicating that the total duration of all of the media content items within the playlist is two minutes.

The SCSS module 127 then transmits an ad playlist response message 214 including the playlist to the SCSC module 125. At block 216, upon the occurrence of the break the SCSC module 125 halts playing the original media content item, and at block 218, begins playing a first media content item of the playlist. Block 218 can include, for example, transmitting a request using a location identifier of the first media content item, and receiving data (e.g., a media stream 219) for the first media content item in response.

In a case involving no further user interaction during the fixed-duration break, the SCSC module 125 can play the first media content item until its end, and play each remaining media content item identified in the playlist (if any) until the end of the fixed-duration break. At that point, the SCSC module 125 can continue playing the original media content item. This process can continue for the original media content item zero, one, or more times for any additional fixed-duration breaks.

However, in some embodiments, the user 102 can be allowed to "skip" the playing of portions of certain media content items during the fixed-duration break. In some embodiments, one or more of the playlist entries can include a "skip-able" (e.g., "skip-eligible" or "skip-allowed") attribute value (e.g., a Boolean type value or similar such as an integer or string, indicating either yes or no in some manner) indicating whether the particular media content item can or cannot be skipped, though in other embodiments every media content item in a playlist can be skipped. As one example, a last media content item of a playlist (or a single media content item of a playlist only having one media content item, etc.) can be configured to have the "skip-able" attribute value set to not allow skips, for example. This "skip-able" attribute value can be set by the SCSS module 127, which can potentially occur according to a designation provided by a provider of the particular media content item.

Additionally, one or more of the playlist entries may include other attributes and attribute values. For example, in some embodiments one or more of the playlist entries can have a "skip allowed after n seconds" attribute, which indicates that the associated media content item can be skipped (or requested to be skipped) after a particular amount of time stipulated by the attribute value. For example, an attribute value of "10" for the "skip allowed after n seconds" attribute may indicate that the associated media content item can be skipped (or requested to be skipped) after 10 seconds of initial playback. Of course, in various embodiments the "skipped allowed after n seconds" could be flexibly configured in similar ways, such as using a different timing granularity (e.g., "skip allowed after m minutes") or a different timing indicator (e.g., "skipped allowed after 10%", indicating that a skip can be allowed after ten percent of the duration of the media content item has been played).

Figure 5A:
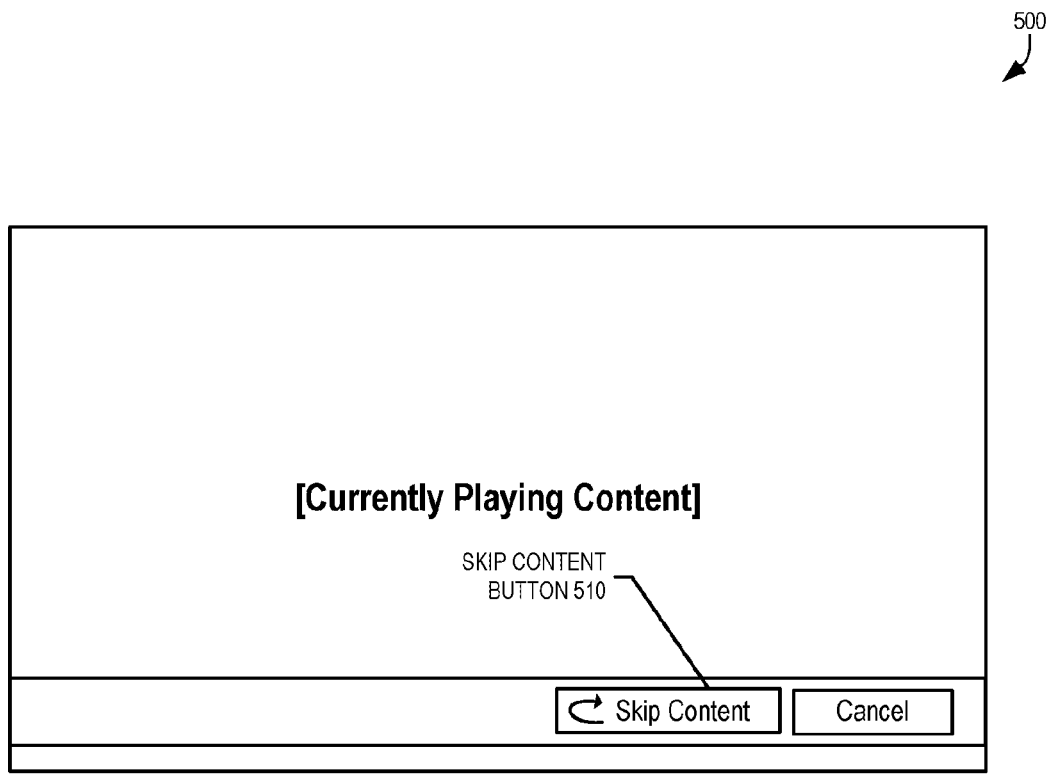
FIG. 5A illustrates an exemplary user interface allowing for media content skipping according to some embodiments.

For the purpose of illustration, we assume that the first media content item is eligible to be skipped. In some embodiments, the SCSC module 125 can be configured to indicate this feature to the user 102, such as by presenting a visual indicator in a user interface display element. For example, FIG. 5A illustrates an exemplary user interface 500 allowing for media content skipping according to some embodiments. This exemplary user interface 500 may be presented by (or caused to be presented by) client device 104 through use of a display device. As an overlay presented with a currently-playing media content (e.g., the first media content item), a menu bar is shown that includes a "skip content" button 510 along with a cancel button. A user's selection of the skip content button 510 thus generates skip request user input 220. This overlay, in some embodiments, will selectively be presented to the user 102 upon a user's request, such as by selecting a "more info" button on a remote. Of course, in some embodiments many other content items can exist in this user interface and/or overlay, which have been omitted here to avoid obscuring aspects of the embodiments.

Turning back to FIG. 2, to request a skip, then, the user 102 at circle 'A1' performs some action to cause a skip request user input 220 to be provided to the SCSC module 125. As described throughout this text, the user 102 can cause this skip request user input 220 to be provided in a variety of ways, including but not limited to using a keyboard, mouse, voice command via a microphone, physical motion via camera, touchscreen, remote control (e.g., infrared signal, Bluetooth, Wi-Fi, etc.), physical interaction with a button or surface of the client device 104, etc.

As one example, the client device 104 can comprise a set-top box executing a SCSC module 125 comprising a software entertainment operating system, which can cause a user interface input button to be presented to the user 102 on a user interface overlay on a television screen that, when selected by the user 102 using a remote control, causes a signal to be sent from the remote control to the client device 104 and to the SCSC module 125.

In response, the SCSC module 125 can transmit a skip request message 222 to the SCSS module 127 indicating the user's 102 desire to skip playing at least some (e.g., a remainder) of the currently-playing first media content item. The skip request message 222 can include one or more of an identifier of the user 102, an identifier of the client device 104, and/or a requested time for an updated playlist. In embodiments where a requested time for an updated playlist is included within the skip request message 222, this requested time can indicate an amount of time remaining in the fixed-duration break as of the time of the skip request message 222 being sent.

Thus, at block 224, the SCSS module 127 can determine an amount of remaining time in the break. In some embodiments, block 224 includes identifying the requested time within the skip request message 222. However, in some embodiments this requested time need not be included within the skip request message 222 as the SCSS module 127 can be configured to determine this time duration on its own based upon its own knowledge of the total duration of the fixed-duration break. Thus, block 224 can include looking up a total duration of the fixed-duration break, looking up an ending time of the fixed-duration break, etc., from a data structure and using this data to determine the amount of remaining time in the break.

In some embodiments, the SCSS module 127 can adjust the amount of remaining time based upon network delay in the system. For example, the SCSS module 127 can be configured to determine a transmission delay between the SCSS module 127 and the requesting SCSC module 125, and in some embodiments can be configured to determine a transmission delay between the particular SCSC module 125 and a media content server 114 (or an average transmission delay between multiple SCSC modules 125 and media content server 114), for example. In some embodiments, these estimated network delay values can be generated in real-time to accommodate for current network loads, and/or can be generated periodically (e.g., in advance) to represent typical delays. Using one or more of these system network delay values, the SCSS module 127 can adjust the remaining time in the break by removing the various network delays involved in returning a playlist to the SCSC module 125, and/or for the SCSC module 125 to retrieve new media content items, etc.

For example, in a scenario where there are twelve seconds remaining in a fixed-duration break, the SCSS module 127 may determine that there will be a one-second network delay in getting a playlist back to the SCSC module 125, and thus the remaining amount of time can be adjusted from twelve to eleven (i.e., by subtracting the one-second delay). Similarly, in some embodiments the remaining amount of time can be further adjusted by another 1.5 seconds, which could represent an estimated amount of time for the SCSC module 125 to be able to retrieve a new media content item to be played. Thus, in this example the remaining amount of time could be further adjusted from eleven seconds to 9.5 seconds. Of course, these network delay type adjustments are merely illustrative, and other sorts of network (and/or processing/transmission/etc.) delay-type values can be both measured and utilized to adjust the remaining amount of time in multiple that are known to those of skill in the art.

Thus, at block 226, the SCSS module 127 can determine a playlist of one or more media content items with a total duration that is equal to or less than the (possibly adjusted) remaining amount of time. Of note is that in some embodiments, the set of candidate media content items may only include media content items having predetermined durations (e.g., 5 sec., 10 sec., 20 sec., etc.). Hence, in some instances (or most instances), it can be impossible for any possible combination of media content items to entirely consume the remaining amount of time.

Figure 3:
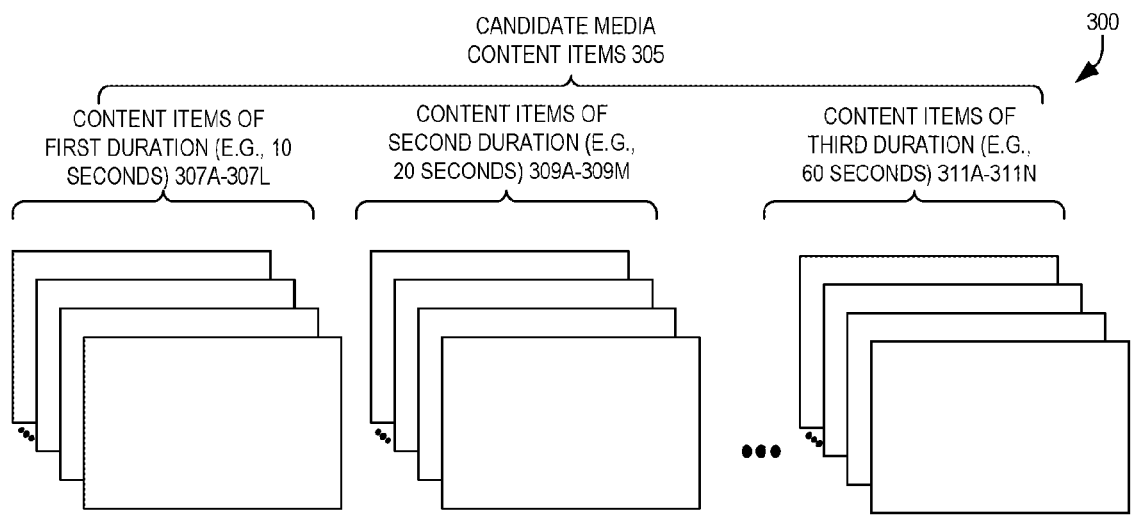
FIG. 3 illustrates exemplary candidate media content items and their use to generate playlists based upon requested time durations according to some embodiments.
Figure 3:
Figure 3:
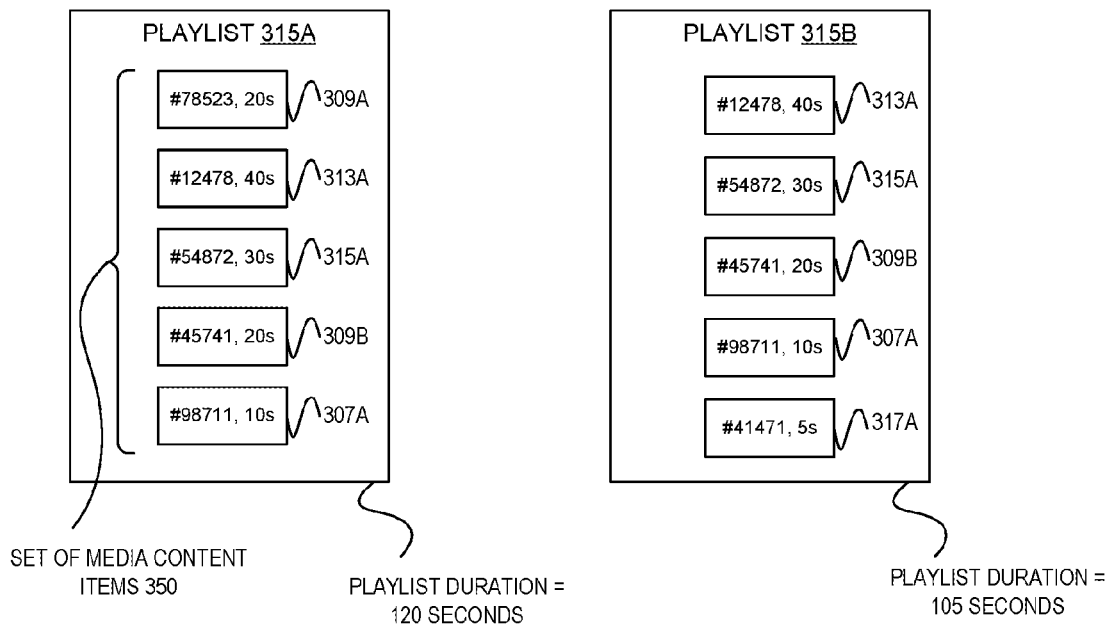

For further insight into the determination of a playlist, we turn to FIG. 3. FIG. 3 illustrates exemplary candidate media content items and their use to generate playlists based upon requested time durations according to some embodiments. FIG. 3 illustrates a set of candidate media content items 305 from which playlists can be generated. In some embodiments, the set of candidate media content items 305 are stored by media content repository 116 in FIG. 1.

In this example, the set of candidate media content items 305 includes a set of content items of a first duration (e.g., 10 seconds each) 307A-307L, another set of content items of a second duration (e.g., 20 seconds each) 309A-309L, and yet another set content items of a third duration (e.g., 60 seconds each) 311A-311L. Of course, the number of different durations, the number of different media content items that belong to each duration, and the particular durations of these content items are merely selected for ease of illustration; other embodiments can use more, the same, or fewer numbers of media content items, different durations, or duration values.

As indicated by circle 'B1'—which corresponds to the circle 'B1' of FIG. 2 next to the initial ad playlist request message 208—a requested duration for a playlist may indicate a time of 120 seconds. Using the set of candidate media items 305—and perhaps based upon significant other customization logic based upon the time of day, particular user 102, the particular streamed original content item having the fixed-duration breaks, etc.—the SCSS module 127 can determine a playlist 315A having a set of media content items 350 having a total duration that matches (or significantly matches, within a small variance amount such as 0.1 s or 0.5 s, for example) the requested time duration. Here, playlist 315A includes a first entry 309A for a first media content item with an identifier of "#78523" (e.g., an identifier that within a particular context uniquely identifies a media content item) and that has a duration of 20 seconds of length. Additionally, the playlist 315A has a second entry 313A (#12478, 40 seconds), third entry 315A (#54872, 30 seconds), fourth entry 309B (#45741, 20 seconds), and a fifth entry 307A (#98711, 10 seconds). Thus, the sum of all the durations (120 seconds) is equal to the requested duration (120 seconds).

However, as indicated by circle 'B2'—which corresponds to the circle 'B2' of FIG. 2 next to the skip request message 222—a requested duration for an updated playlist may indicate a time of 109 seconds. In many usage environments, the set of candidate media content items 305 may not have any combinations of media contents items that could generate a total duration that could equal (or substantially equal) the requested duration.

Thus, in some embodiments, the SCSS module 127 may be configured to generate a playlist with a total duration that is less than the requested duration. In some embodiments, when an exact (or substantially exact) duration match cannot be generated, the SCSS module 127 can be configured to generate a playlist having a maximum possible duration (of all possible playlists) that is still less than the requested duration time. In this example, the SCSS module 127 can generate playlist 315B, which has media content items 313A, 315A, 309B, 307A, and 317A, and which has a total duration time of 105 seconds.

We now turn back to FIG. 2, where the generated updated playlist is returned as an ad playlist response message 228 to the SCSC module 125.

At block 230, the SCSC module 125 determines the duration of the updated playlist, which in some embodiments is carried as a value within the ad playlist response message 228 and in some embodiments can be determined by computing a sum of a duration listed for each media content item entry in the updated playlist.

With this "total" playlist duration, at block 232 the SCSC module 125 can determine a delay duration required to consume the remaining time of the fixed-duration break. For example, in some embodiments the SCSC module 125 subtracts the duration of the updated playlist (e.g., 100 seconds) from the instant remaining amount of time of the fixed-duration break (e.g., 107 seconds) to yield the delay duration (e.g., 7 seconds).

Figure 4:
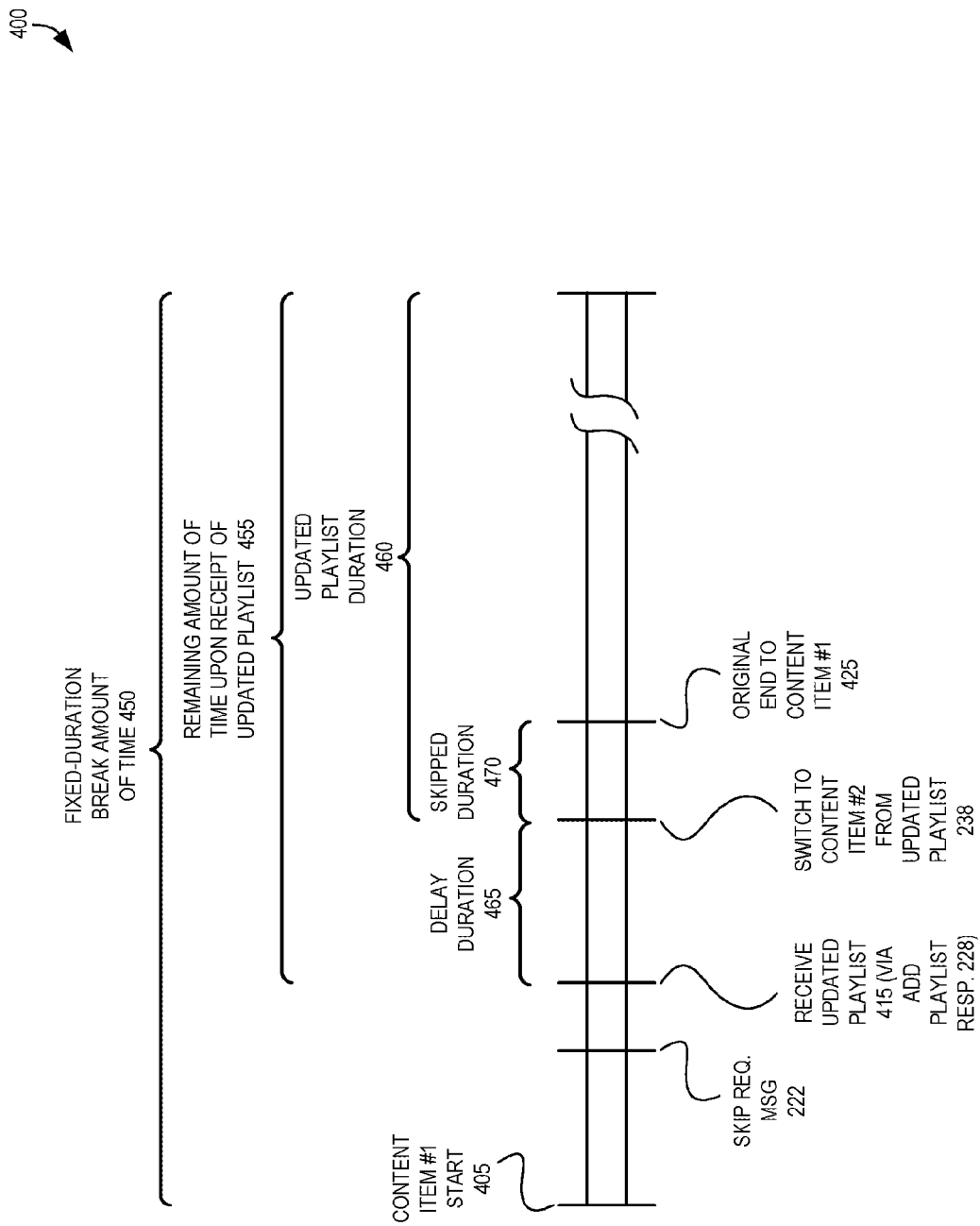
FIG. 4 illustrates exemplary time durations and content item playback points according to some embodiments.

For further detail regarding some possible involved time durations, we turn to FIG. 4, which illustrates exemplary time durations and content item playback points according to some embodiments. FIG. 4 illustrates a timeline 400 representing a fixed-duration break amount of time 450. This timeline 400 is illustrated with break lines to indicate that its length is not to scale. For the purpose of explanation, we assume that at the beginning of the fixed-duration break, a first media content item is played (405). Approximately one-third of the way through the first media content item, a user input is received indicating a desire to skip some of the first media content item, and a skip request message 222 is transmitted, causing the SCSS module 127 to determine an updated playlist for the remainder of the break. As the transmission and receipt of the skip request message 222 takes some time, the determination of the updated playlist takes some time, and the transmission and receipt of the ad playlist response message 228 (with the received updated playlist 415) also takes time, the updated playlist 415 is received a short time after the skip request message 222 was transmitted.

At this point, the SCSC module 125 can determine a delay duration 465 based upon the total duration of the updated playlist 460 along with the remaining amount of time 455. The difference between these values can indicate the delay duration 465 in which the SCSC module 125 can continue to display the first content item.

At the end of the delay duration 465 (signified by circle 'A2-1' in FIG. 2), the SCSC module 125 can then switch to play a content item from the updated playlist 238. It will be appreciated that at this point, a "skipped duration" 470 of the first content item was in fact skipped, as the original end to the first media content item 425 would have occurred subsequent to the switch 238.

Turning back to FIG. 2, the SCSC module 125 can, at block 234 continue playing the first media content item during the delay duration. In some embodiments, the SCSC module 125 can at block 236 present a delayed skip notification to the user 102, which indicates to the user that the user's skip request is acknowledged and will occur in a particular amount of time. This feedback can decrease user frustration, such as when it appears that a particular request went unacknowledged.

Figure 5B:
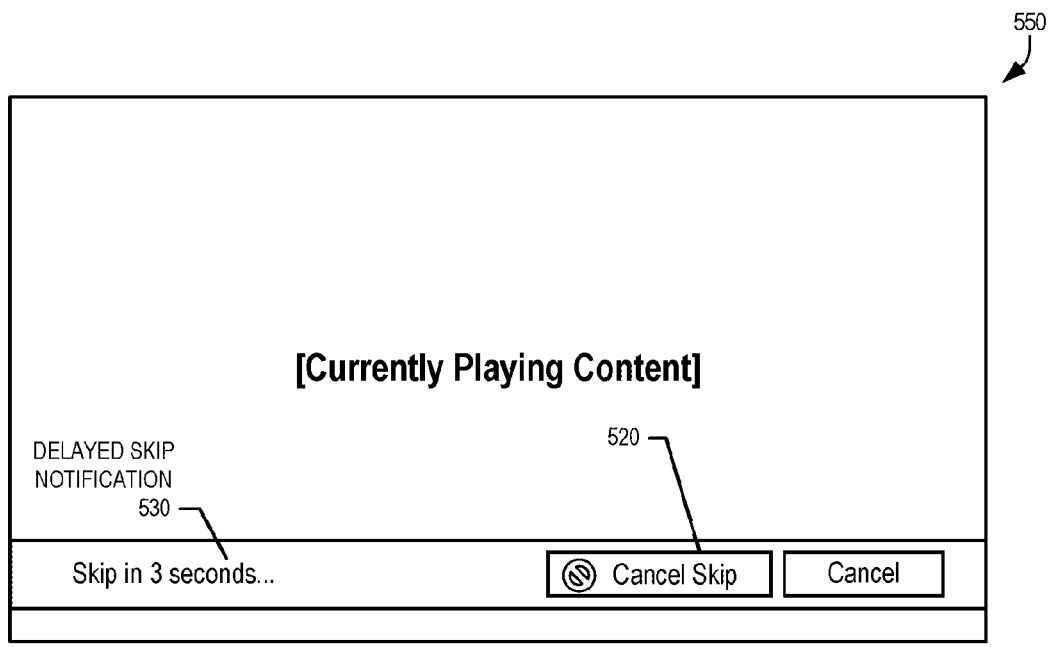
FIG. 5B illustrates an exemplary user interface providing a delayed skip notification and allowing for skip cancellation according to some embodiments.

One example of a delayed skip notification is shown in FIG. 5B, which illustrates an exemplary user interface 550 providing a delayed skip notification 530 (and allowing for skip cancellation) according to some embodiments. This user interface 550 illustrates an overlay placed above a currently-playing media content item, such as a media content item that has been requested to be skipped by a user 102. In this depicted embodiment, the overlay includes a delayed skip notification 530, which here indicates that the currently-playing media content item will "Skip in 3 seconds . . . ." In some embodiments, this delayed skip notification 530 can be displayed at block 236 of FIG. 2, and can begin with a "time to skip" value equal to the delay duration (e.g., 3 seconds) and can decrement as time passes. For example, after one second the delayed skip notification 530 could instead read "Skip in 2 seconds . . . " and after an additional second the delayed skip notification 530 could instead read "Skip in 1 second . . . ."

This exemplary user interface 550 also includes a "cancel skip" user input element 520 (e.g., button) that can be displayed during the delay duration period, with or without the delayed skip notification 530. In some embodiments, during the delay duration period, a user can select this "cancel skip" user input element 520 to cause the "skip" to be canceled, as described later herein with regard to FIG. 6.

Again turning back to FIG. 2, we assume that no "cancel skip" request has been issued, and thus, the SCSC module 125 can continue playing the first media content item until the end of the delay duration. At this point, at block 238 the SCSC module 125 can skip the remainder (e.g., skipped duration 470) of the first media content item and instead begin playing a media content item from the updated playlist received with ad playlist response 228. Assuming no further "skip" requests are issued by the user 102, the process can continue with the SCSC module 125 playing any remaining media content items in the updated playlist until the end of the fixed-duration break.

In embodiments utilizing the above-described types of "skip allowed after n seconds" attribute values for one or more entries of a playlist, the SCSC module 125 can be configured to implement this requirement in different ways. For example, in some embodiments the SCSC module 125 can be configured to not display a skip content button 510 until the particular amount of time has passed.

As another example, in some embodiments the SCSC module 125 can be configured to always display (or allow to be displayed) such a skip content button 510. Thus, in some embodiments the user 102 can provide a skip request input 220 in advance of the configured "skip allowed" time, and the skip request message 222 can be sent to the SCSS module 127 with a "skip requested" time set based upon the "skip allowed" time. For example, for a media content item of 30 seconds of duration, if a "skipped allowed" attribute value is 10 seconds and the user requests a skip after 5 seconds, then a "skip requested" time in the skip request message 222 can indicate a requested skip of 20 seconds (e.g., 30−10) instead of 25 seconds (e.g., 30−5). Accordingly, in some embodiments upon the return of the ad playlist response 228, the delayed skip notification 236 can be immediately displayed to the user 102, and the actual skip 238 would take place at or after the original "skip allowed" time.

For further explanation, consider the following example of an embodiment using actual numeric values. In this example, the original media content item is a live program (e.g., a sporting event) with a fixed-duration advertising break of 120 seconds. A first playlist of ads for the break, which exactly matches the break duration of 120 seconds, could include ads of the following durations (in seconds): 20, 40, 30, 20, and 10. Assuming the user 102 begins streaming the first ad and requests a "skip" at 7 seconds into the ad, a skip request will be sent to the SCSS module 127. In this example, we assume that the SCSS module 127 receives the skip request message precisely 1 second later (due to network latency).

The SCSS module 127 can then determine the remaining duration for the fixed-period break as follows:

Remaining Time=Total Ad Break Duration−(Skip Time+(Network Latency)*2)

Remaining Time=120−(7+(1)*2)=111 Seconds

Of course, this formula could also be expressed in terms of absolute times instead of the relative times that this example utilizes. The SCSS module 127 can then determine a "best fit" substitute playlist, which includes ads of the following durations (in seconds): 40, 30, 20, 10, and 10. Accordingly, this substitute playlist has a total duration of 110 seconds, and is returned to the SCSC module 125.

In this example, we will assume that the actual network latency for returning the substitute ad playlist was less than estimated by the SCSS module 127, so the SCSC module 125 receives the playlist earlier than expected. Thus, the SCSC module 125 determines that the remaining time left in the fixed-duration break is 112 seconds (as opposed to the 111 seconds estimated by the SCSS module 127), and determines that the delay duration (i.e., when the skip should occur) is in 2 seconds:

Delay Duration=Remaining Ad Break Duration− Substitute Ad Playlist Duration

Delay Duration=112−110=2 Seconds.

Thus, the SCSC module 125 can continue playing the original ad from the first playlist and display a delayed skip notification (or "Skip Countdown") for 2 seconds, and then stream the first ad in the substitute ad playlist.

Figure 6:
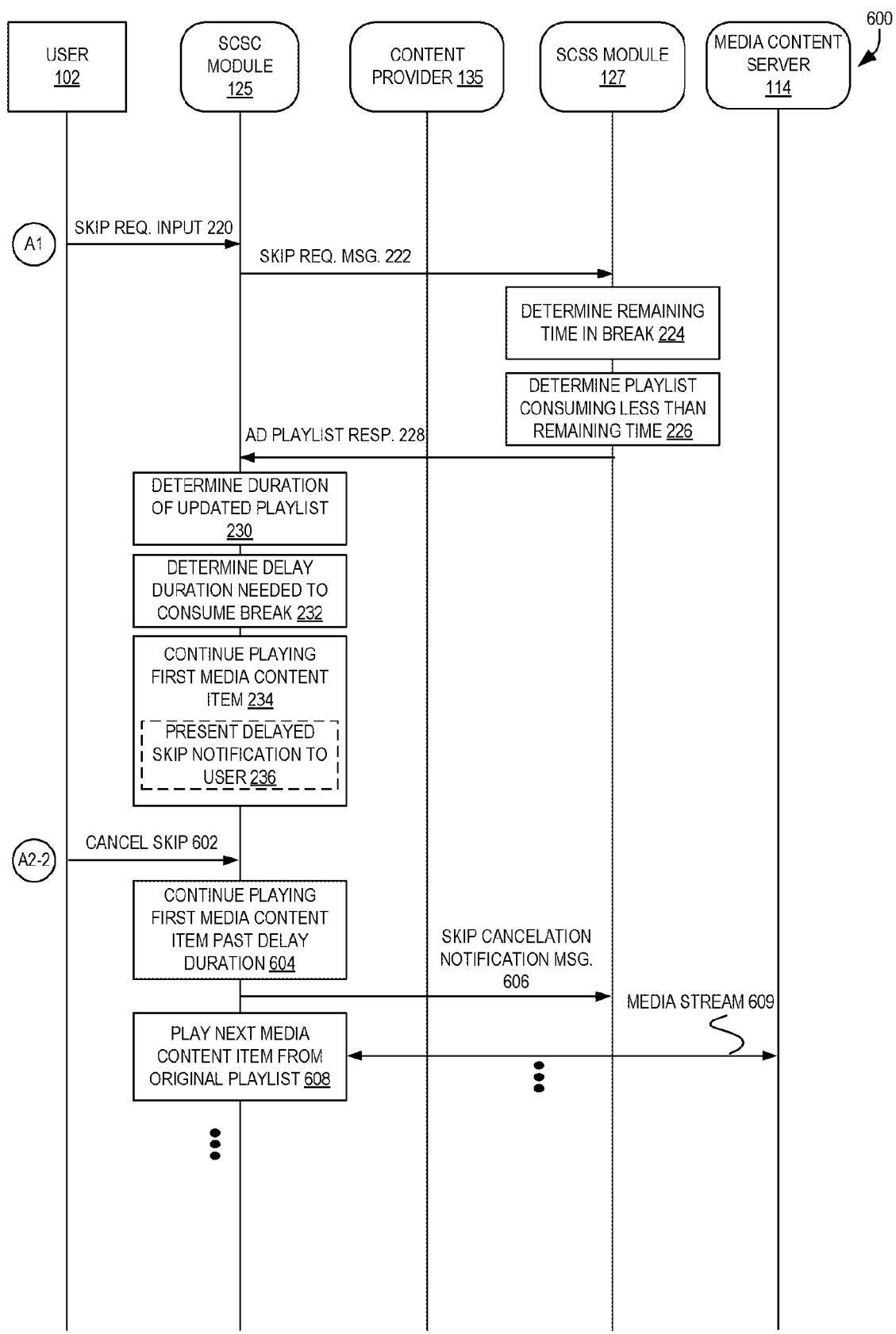
FIG. 6 is a combined sequence and flow diagram illustrating exemplary skip cancellation operations according to some embodiments.

We now turn to embodiments enabling skip cancellation. FIG. 6 is a combined sequence and flow diagram 600 illustrating exemplary skip cancellation operations according to some embodiments. FIG. 6 includes the same entities as FIG. 2, and includes a same portion of operations (from circle 'A1' to circle 'A2-2') as presented in FIG. 2 (from circle 'A1' to 'A2-1'), ranging from a skip request input 220 to the SCSC module 125 continuing to play the skip-requested media content item for up to the delay duration amount of time (which, if reached, would prompt a switch over to a new media content item from the updated playlist of ad playlist response message 228).

However, at circle 'A2-2' of FIG. 6, the illustrated operations include a user 102 causing a cancel skip user input 602 to be provided to the SCSC module 125. For example, the user 102 could select the "Cancel Skip" button 520 of FIG. 5B (e.g., using a remote control). In this depicted embodiment, the SCSC module 125 then, in response, continues 604 playing the first media content item past the delay duration, thus terminating the skip of this first media content item. At some point, the SCSC module 125 can also transmit a skip cancellation notification message 606 indicating that the user 102 canceled the pending "skip" of the first media content item. The skip cancellation notification message 606 can include one or more of the following values: an identifier of the user 102, an identifier of the client device 104, an identifier of the skip cancellation, an identifier of the first media content item that was "un-skipped", a duration into the first media content item at which the cancel skip 602 user input was received, etc. This information, in some embodiments, can be saved by the media reporting and analytics server 112 for further analysis and reporting.

At the end of the playing of the first media content item, the SCSC module 125 can continue at block 608 by playing a next (e.g., second) media content item from the original playlist (e.g., returned with ad playlist response 214 in FIG. 2), perhaps via a media stream 609 from media content server 114. Accordingly, the updated playlist (e.g., returned with ad playlist response 228 in FIG. 2 or FIG. 6) can be discarded. This process can continue with playing one or more remaining media content items identified in the original playlist, of course subject to any further user-desired skips and/or skip cancellations, until an end of the break.

Figure 7:
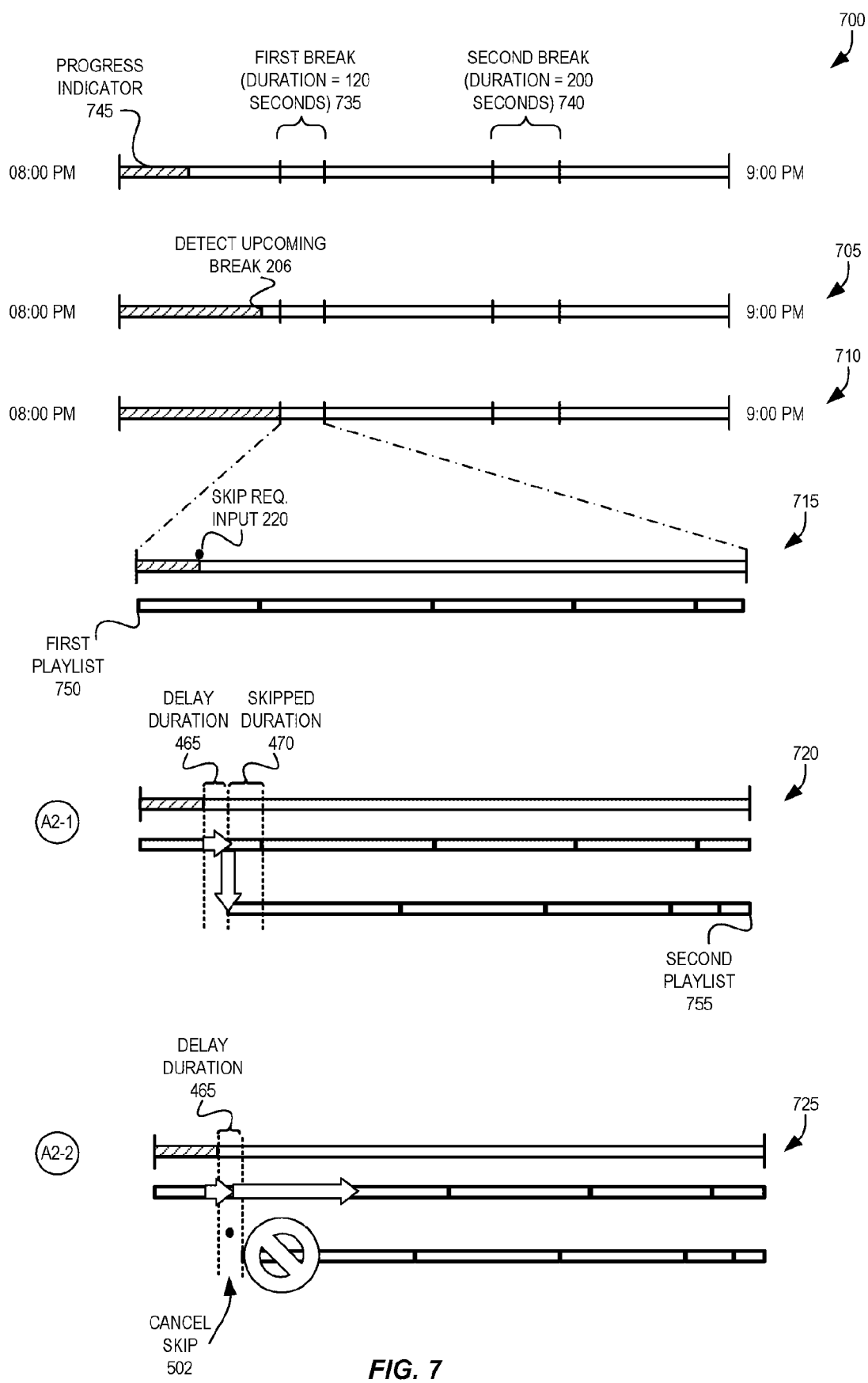
FIG. 7 illustrates exemplary media content progress indicators and multiple playlists utilized for seamless media content switching during fixed-duration breaks according to some embodiments.

For further understanding of the use of different playlists in embodiments enabling skips and skip cancellations, we turn to FIG. 7, which illustrates exemplary media content progress indicators and multiple playlists utilized for seamless media content switching during fixed-duration breaks according to some embodiments.

The first illustrated timeline 700 includes a progress indicator 745 showing that the SCSC module 125 has played a portion of an original media content item having a first break 735 with a break duration of 120 seconds and a second break 740 with a break duration of 200 seconds.

Timeline 705 shows a later point in time compared to timeline 700, where the progress indicator has advanced to be just before the first break 735. At this point, the SCSC module 125 can detect the upcoming break 206 as described earlier herein, and can transmit an ad playlist request message 208 to retrieve a first playlist of media content items to be played during the break.

Next, timeline 710 represents the progress indicator as having reached the break, which is shown in greater detail in timeline 715 adjacent to a timeline 750 for the retrieved first playlist. The timeline 750 for the retrieved first playlist includes vertical bars illustrating the delineation between different media content items to be played during the break, and the timeline 715 shows that a portion of the first media content item has been played when a skip request user input 220 is received.

Thus, timeline 720 illustrates circle 'A2-1' (similar to the circle 'A2-1' of FIG. 2 and FIG. 3) along with an updated second playlist timeline 755, where a delay duration 465 is determined and, due to no skip cancellation on the part of the user 102, playback continues with the first media content item of the first playlist 750 until the end of the delay duration 465, at which point playback switches to a media content item of the second playlist.

Alternatively, timeline 725 illustrates circle 'A2-2' (similar to the circle 'A2-2' of FIG. 2 and FIG. 3) in which, during the continuing of playing the first media content item of the first playlist for up to the delay duration, a cancel skip 602 user input occurs, thus causing the SCSC module 125 to continue playing the first media content item past the delay duration until its end, and then to continue playing any other media content items of the first, original playlist.

Figure 8:
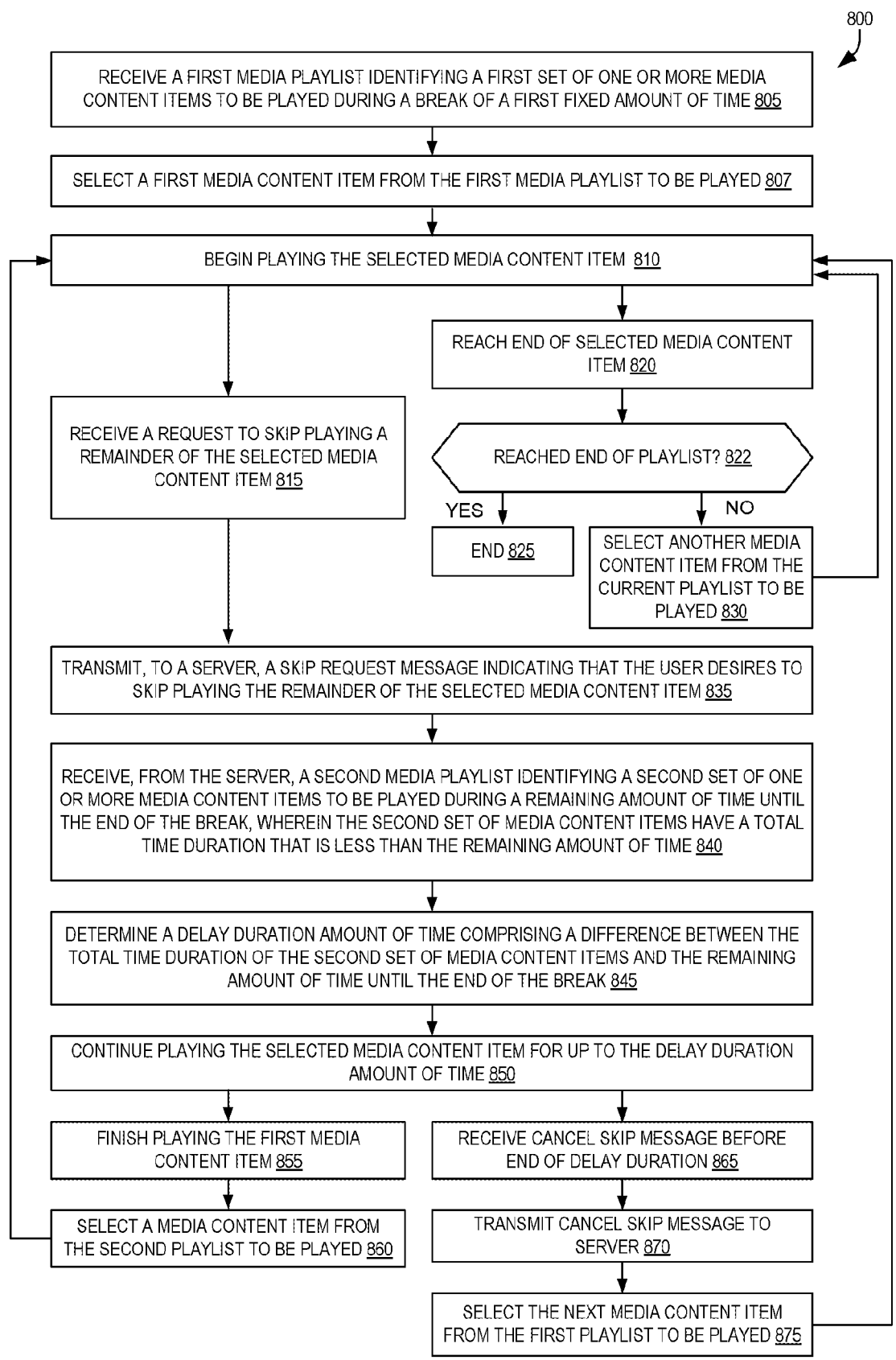
FIG. 8 is a flow diagram illustrating an exemplary flow in a client device for seamless media content switching during fixed-duration breaks according to some embodiments.

FIG. 8 is a flow diagram illustrating an exemplary flow 800 in a client device for seamless media content switching during fixed-duration breaks according to some embodiments. In some embodiments, these operations can be performed by the SCSC module 125 of the other figures. The operations in this and other flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

At block 805, the flow 800 includes receiving a first media playlist identifying a first set of one or more media content items to be played during a break of first fixed amount of time. In some embodiments, block 805 can occur responsive to transmitting a request for a media playlist, which itself can occur responsive to detecting that the fixed-duration break will occur within an upcoming amount of time (e.g., in the next 5 seconds) or has just begun. In some embodiments, the first media playlist is received within an ad playlist response message 214 as described herein. The first media playlist can include one or more playlist entries, where each playlist entry is associated with a media content item, and can include a location identifier (e.g., a URL) of the media content item and/or a duration of the media content item.

At block 807, the flow 800 includes selecting a first media content item from the first media playlist to be played. In some embodiments, block 807 includes identifying a first entry of a plurality of entries of the playlist, and identifying a location identifier of the first entry. Next, block 810 includes beginning to play the selected media content item. Block 810 can include transmitting a request to stream/retrieve the media content item using the identified location identifier, receiving data for the media content item, and processing the received data to cause the media content item to be played. For example, the data for the media content item could represent audio, and processing the data can include causing audio based upon the data to be played/outputted via an audio device (e.g., speakers). As another example, the data for the media content item could represent both audio and video, and processing the data can include causing audio based upon the data to be played/outputted using an audio device, and also video based upon the data to be played/outputted using a display device.

Next, flow 800 can continue in one of two different paths based upon whether, during the playing of the selected media content item, a request is received to skip playing a remainder of that selected media content item (block 815).

If no such request is received, the flow 800 can continue with block 820, where the end of the selected media content item is reached. If the end of the playlist is reached (decision block 822), the flow 800 continues to block 825 and thus ends. However, if it is determined that additional playlist entries exist (at decision block 820), flow continues to block 830, where another media content item for the current playlist is selected to be played. Thereafter, the flow 800 can continue back to block 810, where the selected media content item is played.

However, in the case where, during the playing of a selected media content item, a request is received to skip playing a remainder of that selected media content item (block 815), flow can continue to block 835. In some embodiments, the receipt of the request (block 815) can include receiving a user input indicating a user's desire to skip at least some of the currently-playing media content item. Then, at block 835 a skip request message is transmitted to a server, which indicates that the user desires to skip playing the remainder of the selected media content item. In some embodiments, a receipt of this skip request message by the server causes the server to generate an updated playlist having a total duration that is the same as, or less than, a remaining time of the fixed-duration break.

At block 840, the flow 800 includes receiving, from the server, a second media playlist identifying a second set of one or more media content items to be played during a remaining amount of time until the end of the break. The second set of media content items has a total time duration that is less than the remaining amount of time.

Next, at block 845, the flow 800 includes determining a delay duration amount of time, which can comprise a difference between the total time duration of the second set of media content items and the remaining amount of time until the end of the break. In some embodiments, block 845 includes identifying the total time duration of the second set of media items, which can include computing the total duration based upon individual durations of each media content item entry of the second media playlist, or can include identifying a single total duration value sent in (or with) the second media playlist.

Thus, at block 850, the flow 800 includes continuing to play the selected media content item—which the user indicated should be skipped—for up to the delay duration amount of time.

If, during the delay duration amount of time, a cancel skip message is received (block 865), flow continues with block 870, where a cancel skip message can be transmitted to the server, and block 875, where a next media content item from the "original" first playlist is selected to be played. Flow can then continue back to block 810.

However, flow can instead continue with block 855, where the first media content item is played until the end of the delay duration. At this point, flow can continue with block 860, where a media content item from the "updated" second playlist is selected to be played, and flow continues back to block 810.

Figure 9:
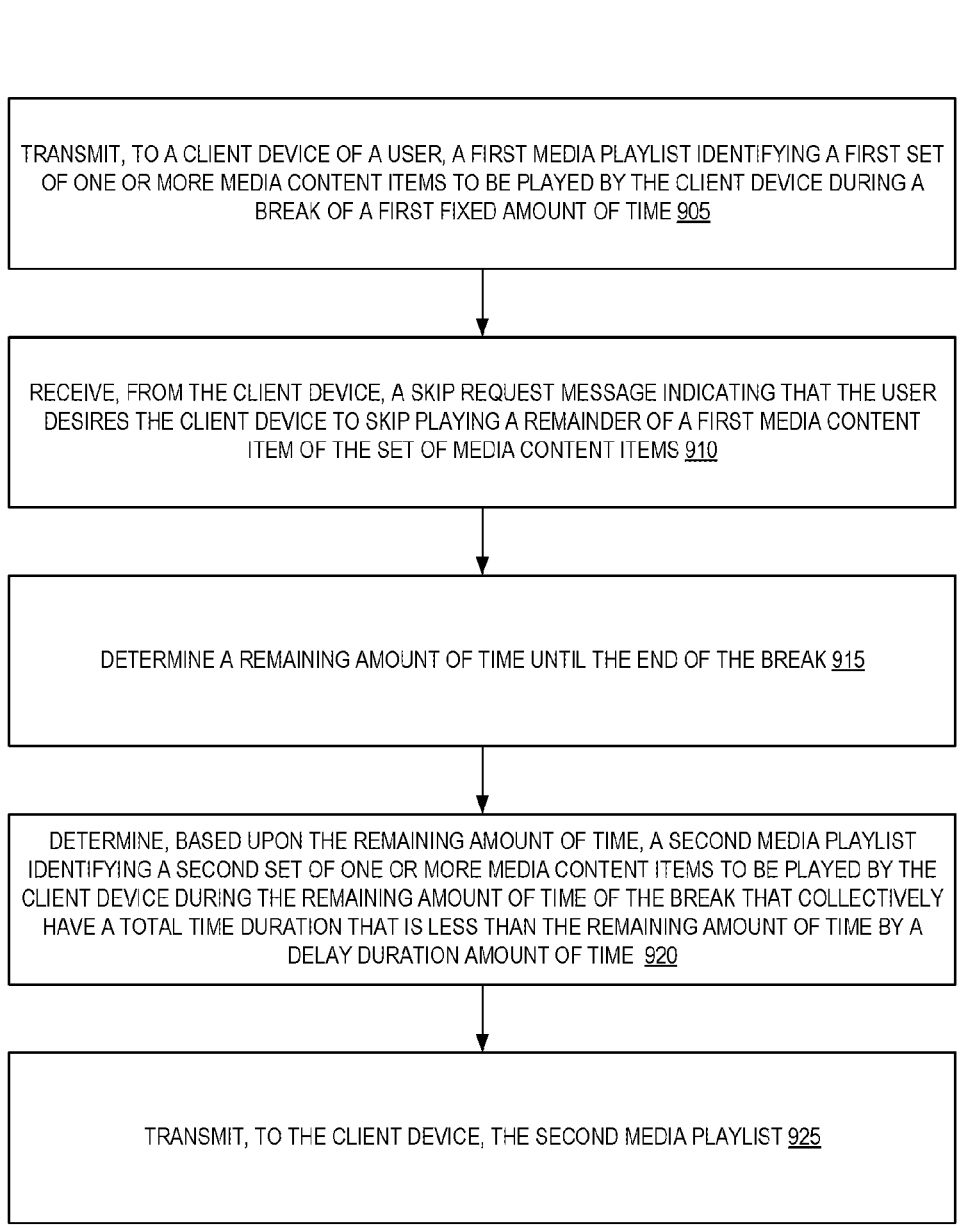
FIG. 9 is a flow diagram illustrating an exemplary flow in a server computing device for seamless media content switching during fixed-duration breaks according to some embodiments.

FIG. 9 is a flow diagram illustrating an exemplary flow 900 in a server computing device for seamless media content switching during fixed-duration breaks according to some embodiments. In some embodiments, these depicted operations can be performed by the SCSS module 127 of the other figures.

At block 905, the flow 900 includes transmitting, to a client device of a user, a first media playlist identifying a first set of one or more media content items to be played by the client device during a break of a first fixed amount of time. The first media playlist can be transmitted with or within an ad playlist response message 214 as described herein. The first media playlist can include one or more playlist entries, where each playlist entry is associated with one of the first set of media content items, and can include a location identifier (e.g., a URL) of the corresponding media content item and/or a duration of the corresponding media content item.

The flow 900 can continue with block 910, where a skip request message is received from the client device indicating that the user desires the client device to skip playing a remainder of a first media content item. In response, at block 915, a remaining amount of time until the end of the break can be determined, and at block 920, based upon the determined remaining amount of time, a second media playlist is determined that identifies a second set of one or more media content items to be played by the client device during the remaining amount of time of the break. The second set of media content items collectively have a total time duration that is less than the remaining amount of time by a delay duration amount of time.

The flow 900 can continue with block 925, where the second media playlist is transmitted to the client device. In some embodiments, in response to receipt of the second media playlist, the client device is configured to continue playing the first media content item for up to the delay duration amount of time. In some circumstances, such as when the client device does not receive any cancel skip messages during the delay duration, the client device can then switch at the end of the delay duration to begin playing at least one content item of the second set of media content items.

The techniques and operations disclosed herein can be implemented, in whole or in part, using one or more electronic devices. An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Some electronic devices also include a set or one or more physical network interface(s) to establish network connections (to transmit and/or receive code and/or data using propagating signals) with other electronic devices. One or more parts of some embodiments may be implemented using different combinations of software, firmware, and/or hardware.

Figure 10:
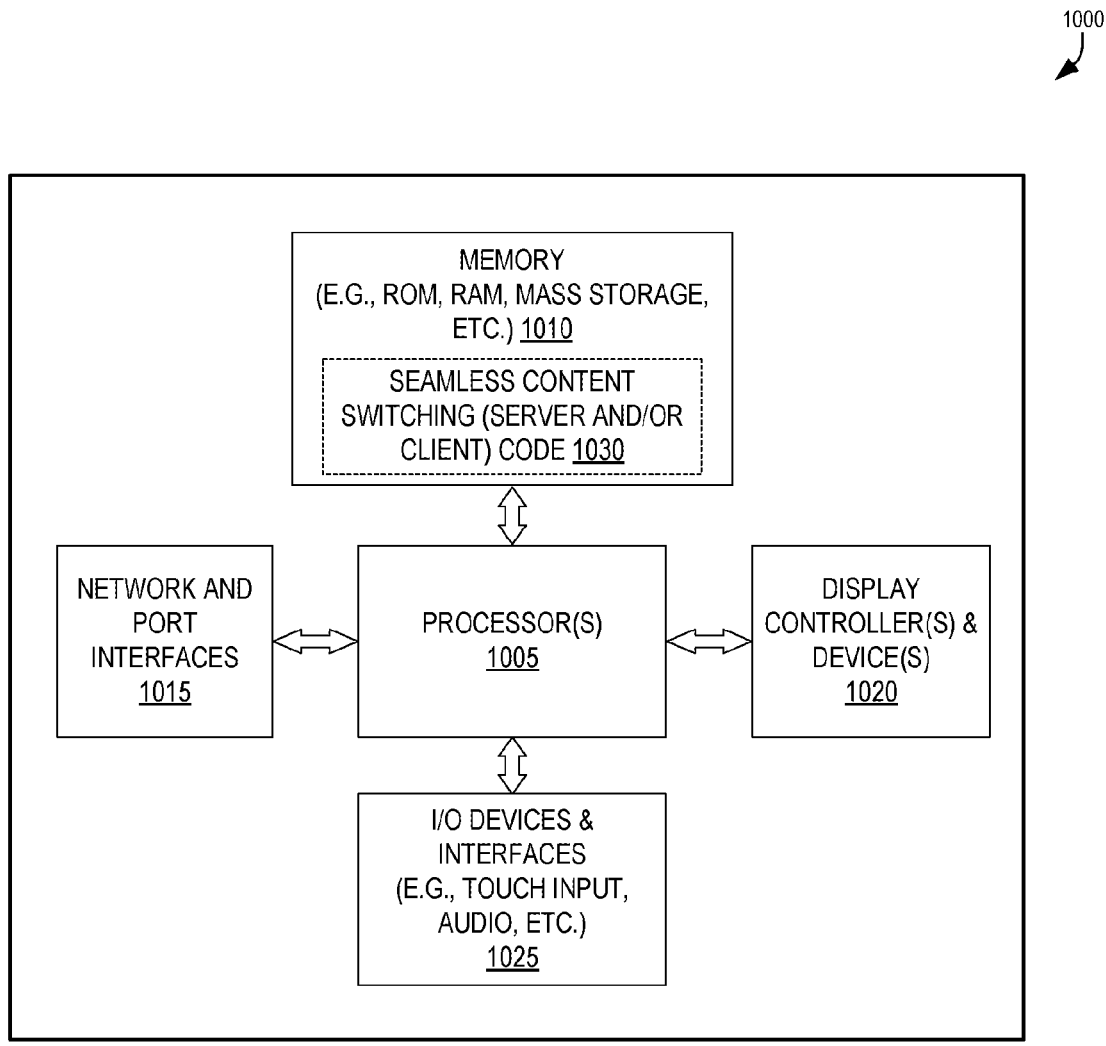
FIG. 10 is a block diagram illustrating an exemplary data processing system that can be used in some embodiments.

FIG. 10 is a block diagram illustrating an exemplary data processing system 1000 that can be used in some embodiments. Data processing system 1000 includes one or more microprocessors 1005 (or processing circuits) and connected system components (e.g., multiple connected chips). Alternatively, the data processing system 1000 can be a system on a chip. One or more such data processing systems 1000 may be utilized to implement the functionality of client device 104, media playlist server 106, server computing device(s) 140, server computing devices 142, and/or third-party media content server 120. For example, server computing device(s) 140 and server computing device(s) 142 may include one or more elements of data processing system 1000.

The illustrated data processing system 1000 includes memory 1010, which is coupled to one or more microprocessor(s) 1005. The memory 1010 can be used for storing data, metadata, and/or programs for execution by the one or more microprocessor(s) 1005. For example, the depicted memory 1010 may store seamless content switching server and/or client code 1030 that, when executed by the microprocessor(s) 1005, causes the data processing system 1000 (e.g., client device 104) to perform seamless media content switching during fixed-duration breaks and perform other operations as described herein. The memory 1010 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1010 may be internal or distributed memory.

The data processing system 1000 also includes an audio input/output (I/O) subsystem 1025 which may include a microphone and/or a speaker for, for example, playing back music or other audio, receiving voice instructions to be executed by the microprocessor(s) 1005, playing audio notifications, etc. A display controller and display device 1020 provides a visual user interface for the user, e.g., graphical user interface (GUI) elements or windows.

The data processing system 1000 also includes one or more input or output ("I/O") devices and interfaces 1015, which are provided to allow a user to provide input to, receive output from, and otherwise transfer data to and from the system 1000. These I/O devices 1015 may include a mouse, keypad, keyboard, a touch panel or a multi-touch input panel, camera, optical scanner, network interface, modem, other known I/O devices or a combination of such I/O devices. The touch input panel can be a single touch input panel that is activated with a stylus or a finger, or a multi-touch input panel that is activated by one finger or a stylus or multiple fingers. The touch input panel can be capable of distinguishing between one or two or three or more touches, and can be capable of providing inputs derived from those differentiated touches to other components of the processing system 1000.

The I/O devices and interfaces 1025 can also include a connector for a dock or a connector for a USB interface, FireWire. Thunderbolt, Ethernet, etc., to connect the system 1000 with another device, external component, or network. Exemplary I/O devices and interfaces 1015 can also include wireless transceivers, such as an IEEE 802.11 transceiver, an infrared transceiver, a Bluetooth transceiver, a wireless cellular telephony transceiver (e.g., 2G, 3G, 4G), or another wireless protocol to connect the data processing system 1000 with another device, external component, or network, and receive stored instructions, data, tokens, etc. It will be appreciated that one or more buses may be used to interconnect the various components shown in FIG. 10.

It will be appreciated that additional components, not shown, may also be part of the system 1000, and, in certain embodiments, fewer components than those shown in FIG. 10 may also be used in a data processing system 1000. For example, in some embodiments where the data processing system 1000 is a set top box, the set top box may include components such as a digital broadcast receiver (e.g., satellite dish receiver, radio frequency (RF) receiver, microwave receiver, multicast listener, etc.) and/or a tuner that tunes to appropriate frequencies or addresses of received content. For example, a tuner may be configured to receive digital broadcast data in a particularized format, such as MPEG-encoded digital video and audio data, as well as digital data in many different forms, including software programs and programming information in the form of data files. As another example, the set top box may include a key listener unit to receive authorization and/or session keys transmitted from a server. The keys received by listener unit may be used by cryptographic security services implemented in a protection mechanism in the set top box to enable decryption of the session keys and data.

Figure 11A:
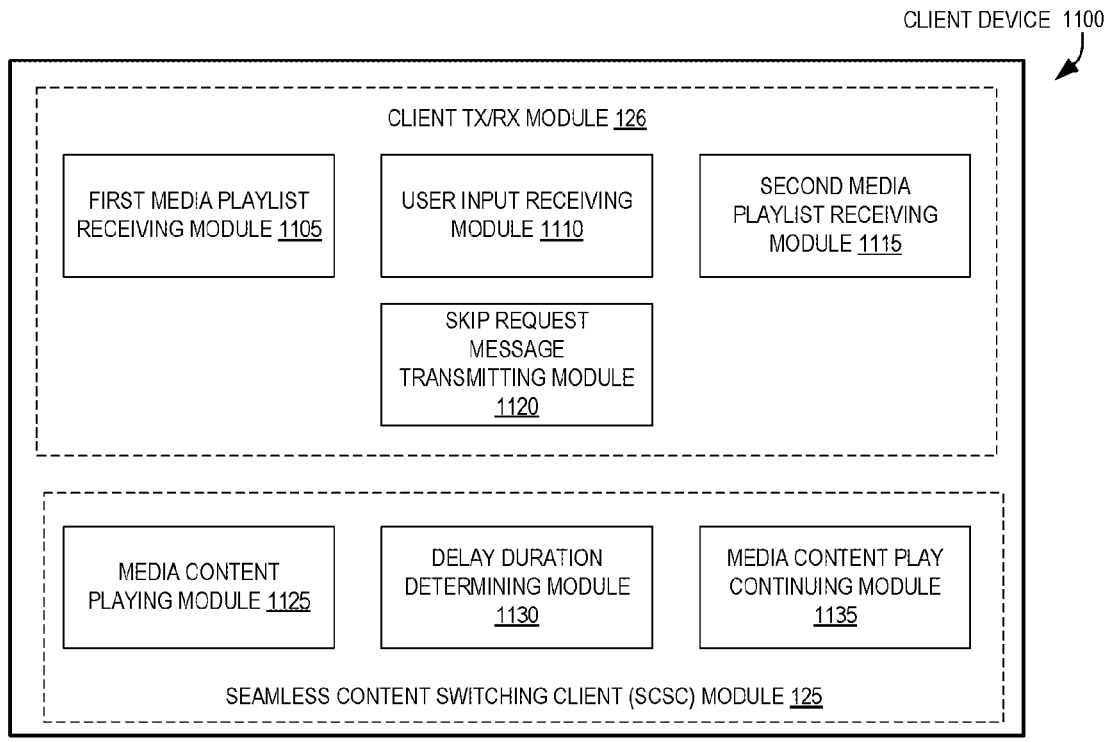
FIG. 11A illustrates a non-limiting example functional block diagram of a client device in accordance with some embodiments.
Figure 11B:
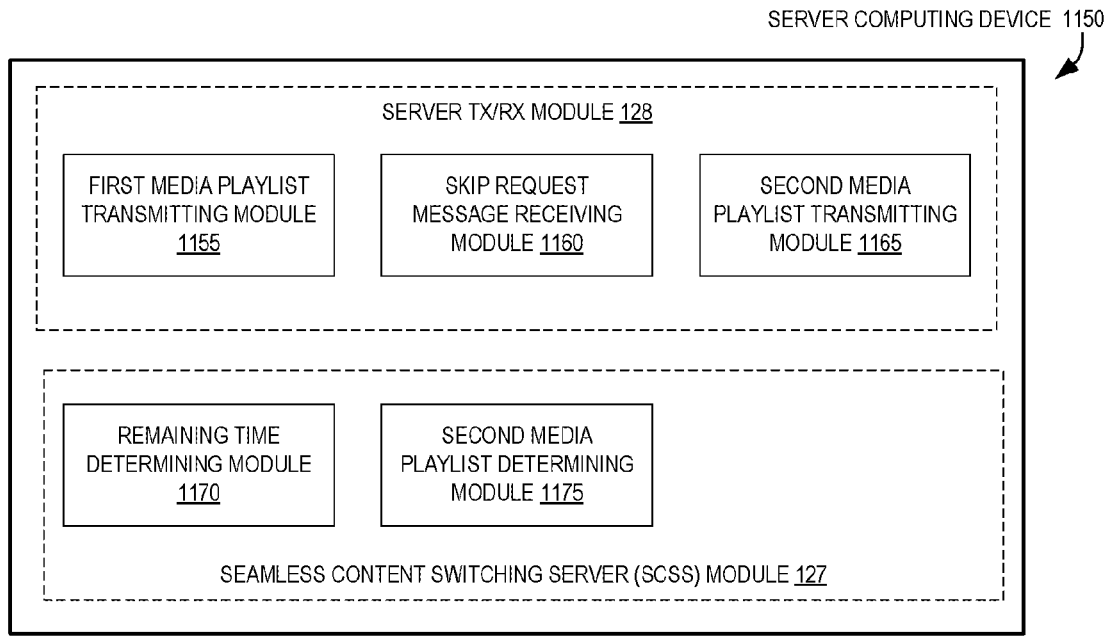
FIG. 11B illustrates a non-limiting example functional block diagram of a server computing device in accordance with some embodiments.

FIGS. 11A and 11B provide logical views of a client device 1100, server computing device 1150, and the modules included in each. It is not strictly necessary that each module be implemented as physically separate units. Some or all modules may be combined in a physical unit. Also, the modules need not be implemented strictly in hardware. It is envisioned that the units may be implemented through a combination of hardware and software. For example, one or both of the client device 1100 and server computing device 1150 may include one or more central processing units executing program instructions stored in a non-transitory storage medium or in firmware to perform the functions of the modules.

FIG. 11A illustrates a non-limiting example functional block diagram of a client device 1100 in accordance with some embodiments. The client device 1100 can include a first media playlist receiving module 1105, a user input receiving module 1110, a second media playlist receiving module 1115, a skip request message transmitting module 1120, a media content playing module 1125, a delay duration determining module 1130, and a media content play continuing module 1135.

In some embodiments, the first media playlist receiving module 1105, user input receiving module 1110, second media playlist receiving module 1115, and skip request message transmitting module 1120 are implemented by the client TX/RX module 126 described herein.

In some embodiments, the media content playing module 1125, delay duration determining module 1130, and media content play continuing module 1135 can be implemented by the SCSC module 125 described herein.

The first media playlist receiving module 1105 can be adapted for receiving a first media playlist 214 identifying a first set of one or more media content items 350 to be played during a break 735 of a first fixed amount of time 450. The media content playing module 1125 can be adapted for playing at least a portion of a first media content item 309A from the first set of media content items of the first media playlist 214. The user input receiving module 1110 can be adapted for receiving a first user input 220 indicating that the user 102 desires to skip playing a remainder of the first media content item 309A. The skip request message transmitting module 1120 can be adapted for transmitting, to a server computing device 140, a skip request message 222 indicating that the user 102 desires to skip playing the remainder 470 of the first media content item 309A. The second media playlist receiving module 1115 can be adapted for receiving, from the server computing device 140, a second media playlist 228 identifying a second set of one or more media content items 350 to be played during a remaining amount of time 455 until the end of the break 735, wherein the second set of media content items 350 have a total time duration 460 that is less than the remaining amount of time 455. The delay duration determining module 1130 can be adapted for determining a delay duration 465 amount of time comprising a difference between the total time duration 460 of the second set of media content items 350 and the remaining amount of time 455 until the end of the break 735. The media content play continuing module 1135 can be adapted for continuing to play the first media content item 309A for up to the delay duration 465 amount of time.

FIG. 11B illustrates a non-limiting example functional block diagram of a server computing device 1150 in accordance with some embodiments. The server computing device 1150 can include a first media playlist transmitting module 1155, a skip request message receiving module 1160, a second media playlist transmitting module 1165, a remaining time determining module 1170, and a second media playlist determining module 1175.

In some embodiments, the first media playlist transmitting module 1155, skip request message receiving module 1160, and second media playlist transmitting module 1165 are implemented by the server TX/RX module 128 described herein.

In some embodiments, the remaining time determining module 1170 and the second media playlist determining module 1175 can be implemented by the SCSS module 127 described herein.

The first media playlist transmitting module 1155 can be adapted for transmitting, to a client device 104 of a user 102, a first media playlist 214 identifying a first set of one or more media content items 350 to be played by the client device 104 during a break 735 of a first fixed amount of time 450. The skip request message receiving module 1160 can be adapted for receiving, from the client device 104, a skip request message 222 indicating that the user 102 desires the client device 104 to skip playing a remainder of a first media content item 309A of the set of media content items. The remaining time determining module 1170 can be adapted for determining a remaining amount of time 455 until the end of the break 735. The second media playlist determining module 1175 can be adapted for determining, based upon the remaining amount of time 455, a second media playlist 228 identifying a second set of one or more media content items 350 to be played by the client device 104 during the remaining amount of time 455 of the break 735, wherein the second set of media content items 350 have a total time duration 460 that is less than the remaining amount of time 455 by a delay duration 465 amount of time. The second media playlist transmitting module 1165 can be adapted for transmitting, to the client device 104, the second media playlist 228.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" and the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular progranuning language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Throughout the description, embodiments of the present invention have been presented through flow diagrams. It will be appreciated that the order of transactions and transactions described in these flow diagrams are only intended for illustrative purposes and not intended as a limitation of the present invention. For example, although the flow diagrams illustrated in the figures show a particular order of operations performed by certain embodiments, it should be understood that such order is exemplary (e.g., alternative embodiments may perform the operations in a different order, combine certain operations, overlap certain operations, etc.). Accordingly, one having ordinary skill in the art would recognize that variations can be made to the flow diagrams without departing from the broader spirit and scope of the invention as set forth in the following claims. Various modifications and equivalents are within the scope of the following claims.

What is claimed is:

1. A method in a client device for seamless content switching during fixed-duration media breaks, the method comprising:
receiving, by the client device, from a server computing device, a first media playlist identifying a first set of one or more media content items to be played during a break of a first fixed amount of time;
playing, by the client device, at least a portion of a first media content item from the first set of media content items of the first media playlist;
receiving, by the client device, a first user input indicating that the user desires to skip playing a remainder of the first media content item;
transmitting, by the client device, to the server computing device, a skip request message indicating that the user desires to skip playing the remainder of the first media content item;
receiving, by the client device, from the server computing device, a second media playlist identifying a second set of one or more media content items to be played during a remaining amount of time until the end of the break, wherein the second set of media content items has a total time duration that is less than the remaining amount of time;
determining, by the client device, a delay duration amount of time comprising a difference between the total time duration of the second set of media content items and the remaining amount of time until the end of the break; and
while continuing to play, by the client device, the first media content item for up to the delay duration amount of time, presenting, to the user, an indication that the first media content item will be skipped after the delay duration amount of time has elapsed.

2. The method of claim 1, further comprising:
after the continuing to play the first media content item for the delay duration amount of time, switching to play, by the client device, at least one media content item of the second set of media content items.

3. The method of claim 1, further comprising:
before the end of the delay duration amount of time, receiving, by the client device, a second user input indicating that the user no longer desires to skip playing the remainder of the first media content item; and
completing, by the client device, the playing of the entire first media content item.

4. The method of claim 3, further comprising:
after the completing of the playing of the entire first media content item, playing, by the client device, a second media content item from the first set of media content items identified by the first media playlist.

5. The method of claim 3, further comprising:
transmitting, by the client device, to the server computing device, a cancel skip message indicating that the user desires to continue the playing of the first media content item.

6. The method of claim 1, further comprising:
receiving, by the client device, a break duration value indicating the first fixed amount of time of the break.

7. The method of claim 1, wherein the delay duration amount of time further comprises a remaining mandatory playing time for the first media content item.

8. The method of claim 1, wherein the indication that the first media content item will be skipped after the delay duration amount of time has elapsed comprises a countdown based on the delay duration amount of time.

9. A client device configured for seamless content switching during fixed-duration media breaks, the client device comprising a processor and a memory storing instructions, wherein the instructions, when executed by the processor, configure the client device to:
receive, from a server computing device, a first media playlist identifying a first set of one or more media content items to be played during a break of a first fixed amount of time;
play at least a portion of a first media content item from the first set of media content items of the first media playlist;
receive a first user input from a user indicating that the user desires to skip playing a remainder of the first media content item;
transmit, to the server computing device, a skip request message indicating that the user desires to skip playing the remainder of the first media content item;
receive, from the server computing device, a second media playlist identifying a second set of one or more media content items to be played during a remaining amount of time until the end of the break, wherein the second set of media content items has a total time duration that is less than the remaining amount of time;
determine a delay duration amount of time comprising a difference between the total time duration of the second set of media content items and the remaining amount of time until the end of the break; and
while continuing to play the first media content item for up to the delay duration amount of time, present to the user an indication that the first media content item will be skipped after the delay duration amount of time has elapsed.

10. The client device of claim 9, wherein the instructions, when executed by the processor, further configure the client device to:
after the continuing to play the first media content item for the delay duration amount of time, switch to play at least one media content item of the second set of media content items.

11. The client device of claim 9, wherein the instructions, when executed by the processor, further configure the client device to:
before the end of the delay duration amount of time, receive a second user input indicating that the user no longer desires to skip playing the remainder of the first media content item; and
complete the playing of the entire first media content item.

12. The client device of claim 11, wherein the instructions, when executed by the processor, further configure the client device to:
after the completing of the playing of the entire first media content item, play a second media content item from the first set of media content items identified by the first media playlist.

13. The client device of claim 11, wherein the instructions, when executed by the processor, further configure the client device to:
transmit, to the server computing device, a cancel skip message indicating that the user desires to continue the playing of the first media content item.

14. The client device of claim 9, wherein the instructions, when executed by the processor, further configure the client device to:
receive a break duration value indicating the first fixed amount of time of the break.

15. The client device of claim 9, wherein the delay duration amount of time further comprises a remaining mandatory playing time for the first media content item.

16. The client device of claim 9, wherein the indication that the first media content item will be skipped after the delay duration amount of time has elapsed comprises a countdown based on the delay duration amount of time.

* * * * *